United States Patent [19]
Kobayashi et al.

[11] Patent Number: 5,704,761
[45] Date of Patent: Jan. 6, 1998

[54] FULL-CIRCUMFERENTIAL FLOW PUMP

[75] Inventors: Makoto Kobayashi; Masakazu Yamamoto; Yoshio Miyake; Koji Isemoto; Keita Uwai; Yoshiaki Miyazaki, all of Kanagawa-ken, Japan

[73] Assignee: Ebara Corporation, Tokyo, Japan

[21] Appl. No.: 567,235

[22] Filed: Dec. 5, 1995

Related U.S. Application Data

[60] Division of Ser. No. 275,519, Jul. 15, 1994, Pat. No. 5,494,403, which is a continuation-in-part of Ser. No. 45,686, Apr. 14, 1993, Pat. No. 5,385,444.

[30] Foreign Application Priority Data

| Apr. 14, 1992 | [JP] | Japan | 4-120177 |
| Jul. 6, 1992 | [JP] | Japan | 4-201988 |
| Oct. 13, 1993 | [JP] | Japan | 5-280114 |
| Mar. 1, 1994 | [JP] | Japan | 6-054861 |

[51] Int. Cl.$^6$ ............................................ F04D 29/42
[52] U.S. Cl. .................. 415/182.1; 415/98; 415/102
[58] Field of Search .................. 415/93, 98, 99, 415/101, 102, 214.1, 182.1; 417/350, 366, 371

[56] References Cited

U.S. PATENT DOCUMENTS

| 2,114,907 | 4/1938 | Oesterlein | 417/366 |
| 2,201,437 | 5/1940 | Kice, Jr. | 415/98 |
| 3,347,168 | 10/1967 | Nixon | 417/350 |
| 4,229,142 | 10/1980 | Le Dall et al. | 417/350 |
| 4,518,311 | 5/1985 | Dernedde et al. | 415/102 |
| 4,865,517 | 9/1989 | Beehler | 415/214.1 |
| 5,401,146 | 3/1995 | Moriya et al. | 415/214.1 |
| 5,463,124 | 10/1995 | Eskew | 415/102 |
| 5,478,215 | 12/1995 | Kobayashi et al. | 417/366 |

Primary Examiner—John T. Kwon
Attorney, Agent, or Firm—Oblon, Spivak, McClelland, Maier & Neustadt, P.C.

[57] ABSTRACT

A full circumferential flow double suction pump has a pair of pump assemblies mounted on respective opposite ends of the rotor shaft of the motor mounted within an outer frame casing. The motor is positioned within an outer cylinder such that an annular space is defined between the outer frame casing and the outer cylinder. A discharge port connects with the annular space. A pair of cylindrical cup-shaped pump casings are connected to respective opposite ends of the outer cylinder for housing the pump assemblies. A header pipe connects the suction nozzles of the cylindrical cup-shaped pump casings to each other and has a suction port defined therein for introducing a fluid therethrough and through the suction nozzles into the pump assemblies.

4 Claims, 18 Drawing Sheets

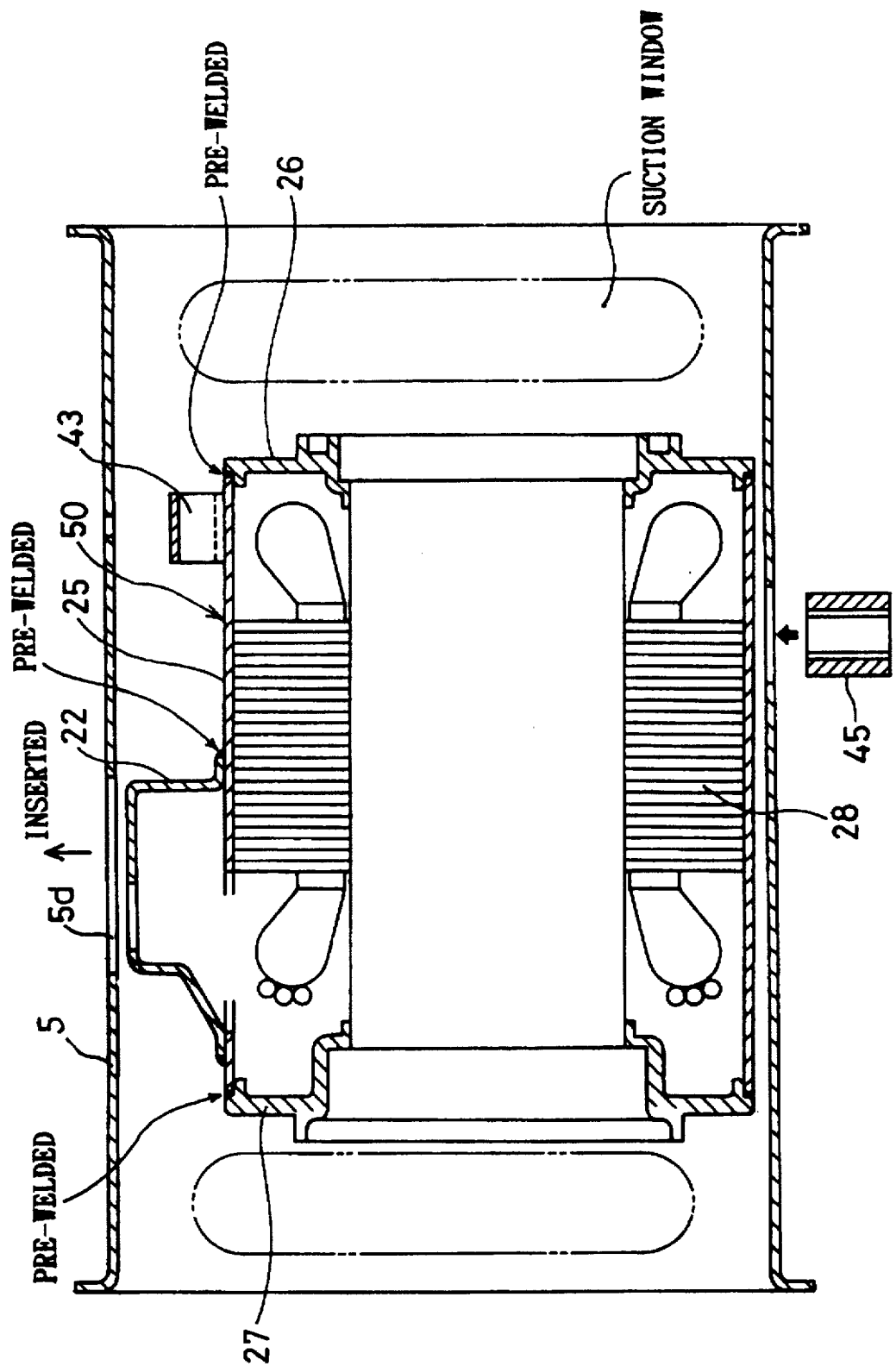

1) CHARACTERISTIC CURVE OF IMPELLER ELEMENT A
2) " " IMPELLER ELEMENT B
3) " " DOUBLE-SUCTION PUMP
4) " " CONVENTIONAL PUMP

HEAD (H) vs CAPACITY (OR FLOW RATE) (Q)

(P) vs CAPACITY (OR FLOW RATE) (Q)

EFFICIENCY ($\eta$) vs CAPACITY (OR FLOW RATE) (Q)

F I G. 16
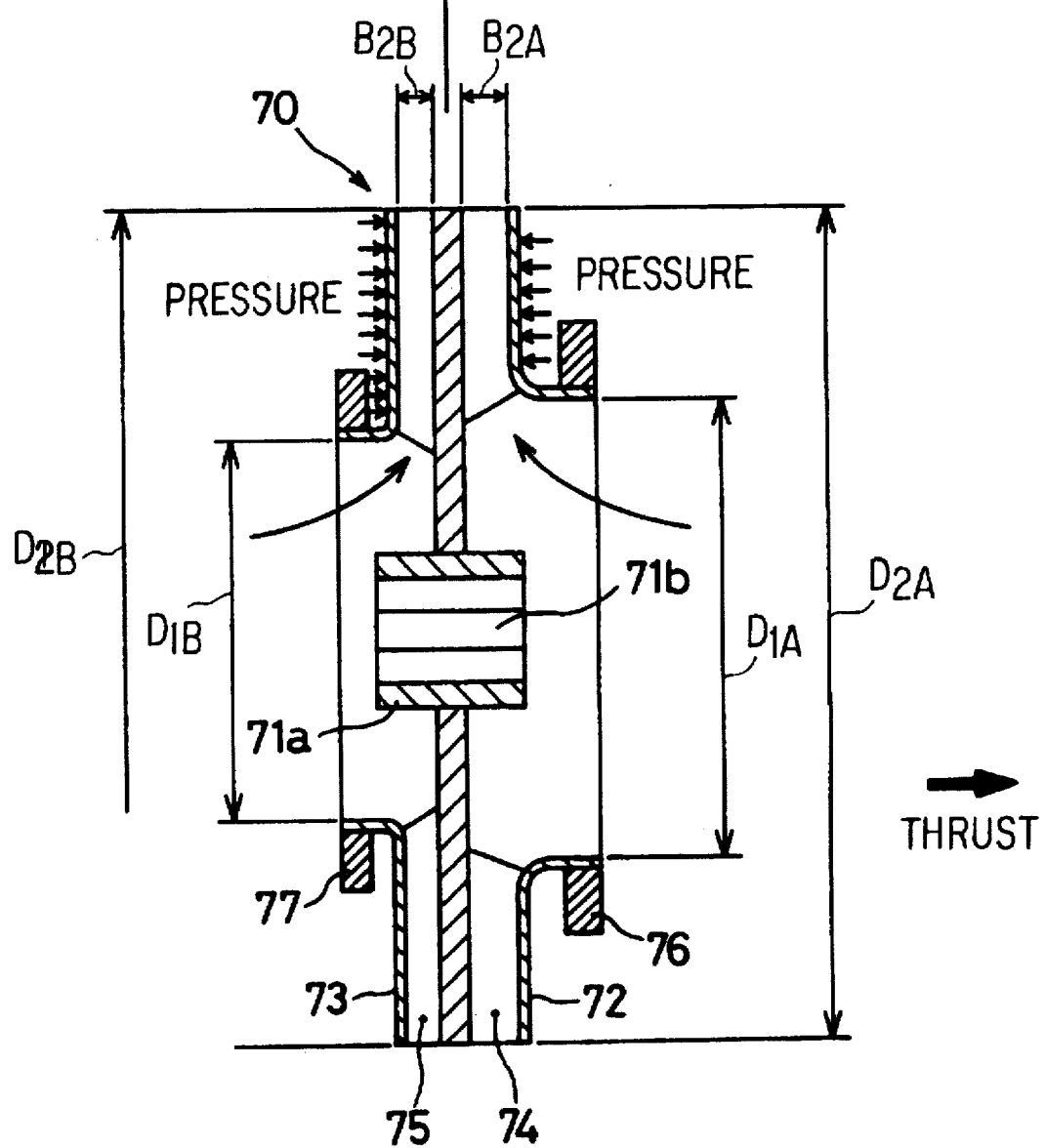

FULL-CIRCUMFERENTIAL FLOW PUMP

This is a Division of application Ser. No. 08/275,519 filed on Jul. 15, 1994 now U.S. Pat. No. 5,494,403, which is a continuation-in-part, of application Ser. No. 08/045,686 filed on Apr. 4, 1993 now U.S. Pat. No. 5,385,444.

BACKGROUND OF THE INVENTION

1. Field of the Invention

The present invention relates to a full-circumferential flow pump, and more particularly to a full-circumferential flow pump which has an impeller mounted on an end of the shaft of a motor and an annular space defined around the motor.

2. Description of the Prior Art

One known pump in which the fluid being handled flows circumferentially around the motor is disclosed in German laid-open patent publication No. 1653692 (DE 1653692). The disclosed pump allows the shaft to be rotated manually and the pump assembly to be serviced without the piping's being detached.

FIG. 18 of the accompanying drawings shows such a known pump. As shown in FIG. 18, the pump has a block-shaped housing 100 which houses a motor comprising a stator 101 and a rotor 102 that is positioned within the stator 101 with a small gap defined therebetween. Impellers 103, 104 are mounted on the respective ends of the shaft of the rotor 102. The fluid which is being handled flows in from an inlet port 105 and is divided into two fluid flows which are pressurized by the respective impellers 103, 104 which are being rotated. The fluid forced out of the impellers 103, 104 merges and is then discharged from an outlet port 106.

In the known pump, however, the stator 101 is subject to pressure irregularities and tends to suffer various mechanical failures. Specifically, there are developed three regions on the outer circumferential surface of the motor. These three regions include:

(1) a region where the fluid flows under the inlet suction pressure;

(2) a region where the fluid flows under the outlet discharge pressure; and (3) a region where the fluid does not flow.

Accordingly, pressures or external forces which are not uniform are applied to the stator 101, possibly causing the stator 101 to be strained or deformed.

The motor is highly likely to undergo mechanical distortions particularly if an outer motor frame casing is made of thin sheet metal or the pressure for discharging the fluid is high. Furthermore, since the outer motor frame casing and an outer pump casing are integrally formed with each other in the disclosed pump, the motor may possibly malfunction when subjected to external forces due to a piping load or the like.

SUMMARY OF THE INVENTION

It is therefore an object of the present invention to provide a full-circumferential flow pump which can uniformize external forces or pressures applied to an outer motor frame casing surrounding a motor stator to thereby prevent the motor frame from being strained or deformed, and can be serviced internally without detachment of the piping.

According to an aspect of the present invention, there is provided a full-circumferential flow pump comprising: a motor having a stator, a rotor mounted on a shaft and disposed in the stator for rotation relative to the stator and an outer frame casing enclosing the stator; an outer cylindrical pump casing disposed around the outer frame casing with an annular space defined therebetween; a pump assembly mounted on an end of the shaft for pumping a fluid into the annular space; and a suction case mounted on an outer circumferential surface of the outer cylindrical pump casing and having a suction port defined therein for introducing a fluid therethrough and through the suction window into the pump assembly.

A fluid drawn in through the suction port flows through the suction case into the pump assembly, and is introduced into impellers mounted on the end of the shaft of the motor. The fluid pressurized by and discharged from the impellers flows into the annular space or passage defined between the outer cylindrical pump casing and the outer frame casing. Since the entire circumferential wall of the outer frame casing is surrounded by the fluid to be discharged from the pump, the entire circumferential wall of the outer frame casing is subject to a uniform fluid pressure and prevented from being irregularly strained or deformed.

According to another aspect of the present invention, there is also provided a full-circumferential flow double-suction pump comprising: a motor having a stator, a rotor mounted on a shaft and disposed in the stator for rotation relative to the stator and an outer frame casing enclosing the stator; an outer cylindrical pump casing disposed around the outer frame casing with an annular space defined therebetween, the outer cylindrical pump casing having a pain of suction windows near the respective axial ends and a discharge port defined therein in communication with the annular space between the suction windows; a pair of pump assemblies mounted on respective opposite ends of the shaft for pumping a fluid into the annular space; and a suction case mounted on an outer circumferential surface of the outer cylindrical pump casing having a suction port defined therein for introducing a fluid therethrough and through the suction windows into the pump assemblies.

In the full-circumferential flow double-suction pump, a fluid drawn in through the suction port is divided into fluid flows which are introduced into the respective pump assemblies where the fluid flows are pressurized by impellers. The fluid flows pressurized by and discharged from the impellers are then introduced into the annular space or passage defined between the outer cylindrical pump casing and the outer frame casing. While flowing through the annular space or passage, the fluid flows are combined with each other and discharged from the discharge port.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a cross-sectional view illustrative of a procedure for assembling the full-circumferential flow pump according to the first embodiment;

FIG. 16 is a cross-sectional view of a modified impeller according to the fifth embodiment of the present invention;

DETAILED DESCRIPTION OF THE PREFERRED EMBODIMENTS

Figure 1:
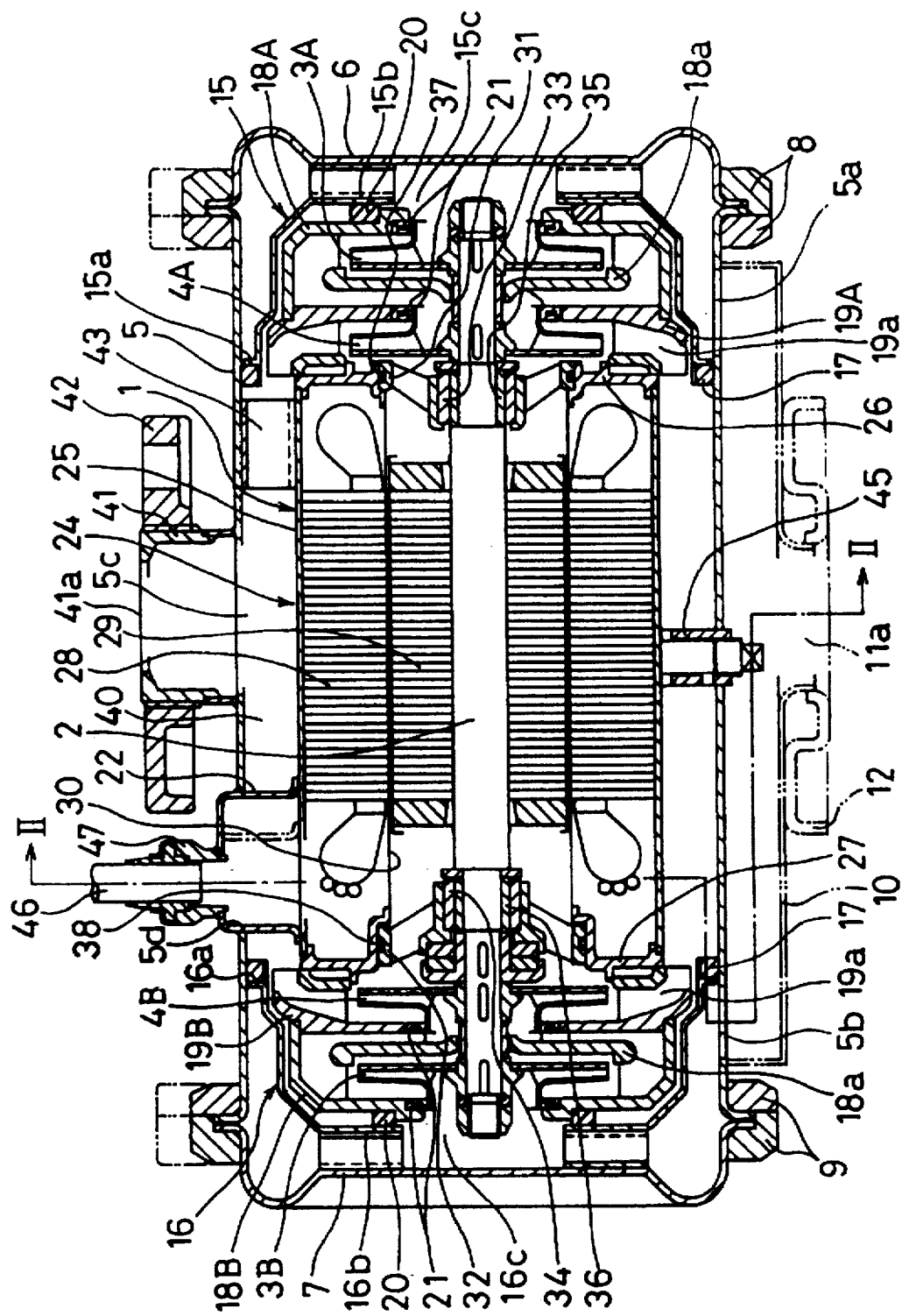
FIG. 1 is a longitudinal cross-sectional view of a full-circumferential flow pump according to the first embodiment of the present invention.

A full-circumferential flow pump according to the first embodiment of the present invention is shown in FIGS. 1 through 4A and 4B. As shown in FIG. 1, the full-circumferential flow pump is of the double-suction type and has a canned motor 1 disposed centrally therein. The canned motor 1 includes a shaft 2 having opposite ends on which there are fixedly mounted respective pairs of impellers 3A, 4A and 3B, 4B each having an axially outwardly open suction region. Thus, two pump assemblies are disposed respectively on the opposite sides of the canned motor 1, the two pump assemblies having the same shut-off head but different flow rates. The canned motor 1 and the impellers 3A, 4A, 3B, 4B are housed in an outer cylindrical pump casing 5 and a pair of spaced end covers 6, 7. The end covers 6, 7 are detachably fastened to the respective axial ends of the outer cylindrical pump casing 5 by respective flanges 8, 9. The impellers 3A, 4A, 3B, 4B have blades made of sheet metal.

Figure 2:
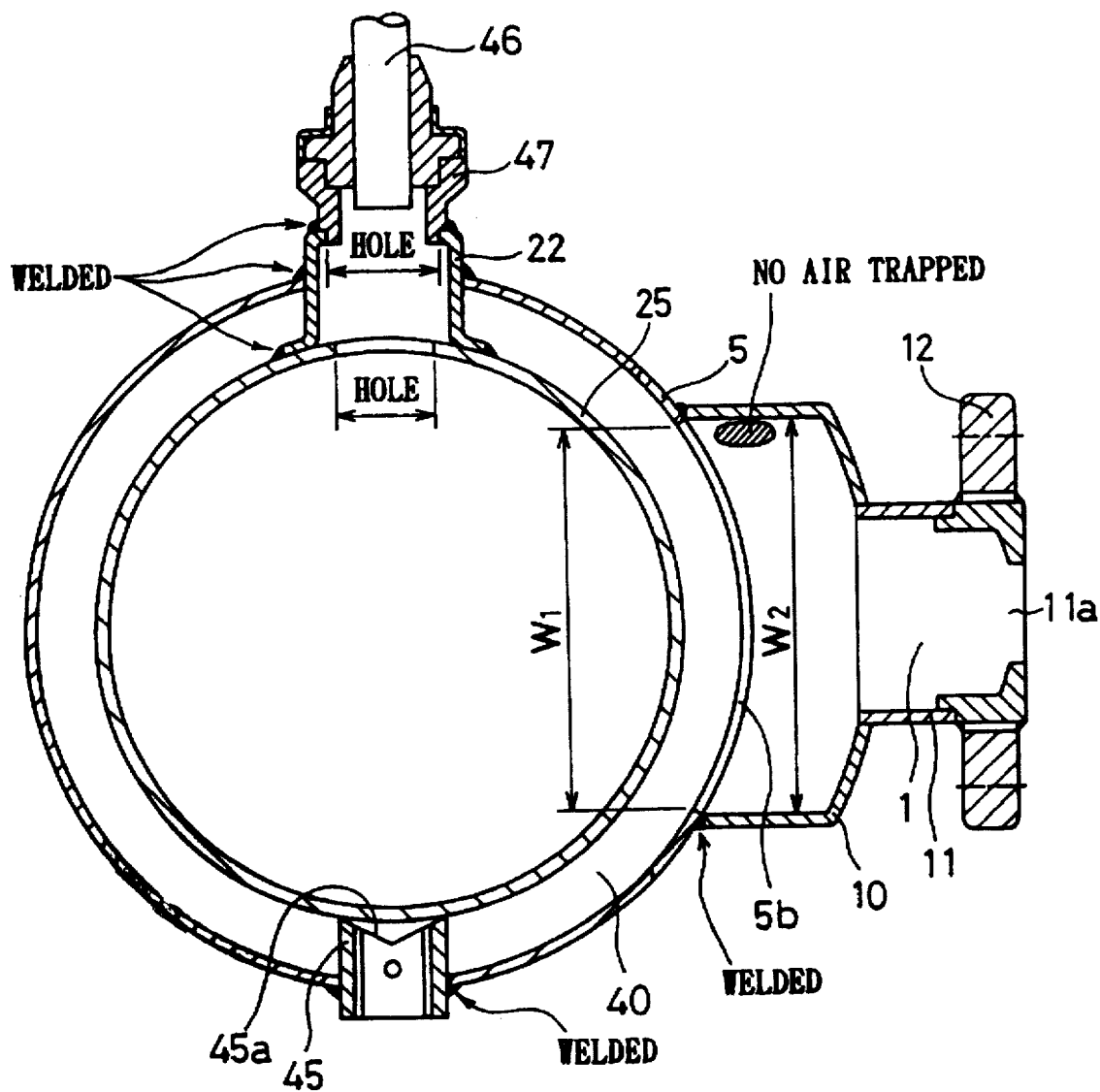
FIG. 2 is a cross-sectional view taken along line II—II of FIG. 1.

The outer cylindrical pump casing 5 has a pair of suction windows 5a, 5b defined therein near the respective axial ends, and a suction case 10 is mounted on an outer surface of the outer cylindrical pump casing 5 so as to connect the suction windows 5a, 5b to each other. The suction case 10 is a substantially rectangular cup-shaped case having a bottom on one end and an opening on the other end. The suction case 10 is provided with a suction nozzle 11 on the bottom thereof. As shown in FIG. 2, the suction case 10 has a width $W_2$, and the suction windows 5a, 5b having a circumferential width $W_1$ substantially equal to the width $W_2$ so that no air will be trapped in the suction case 10. A suction flange 12 is mounted on the suction nozzle 11 with a suction port 11a defined therein.

As shown in FIG. 1, two axially spaced partition walls 15, 16 are fixedly mounted in the outer cylindrical pump casing 5 substantially around the respective pairs of impellers 3A, 4A, 3B, 4B. The partition walls 15, 16 have respective axial openings 15a, 16a in which respective seal members 17 of a resilient material such as rubber are secured, and include respective bottoms 15b, 16b with suction openings 15c, 16c defined respectively therein.

First inner casings 18A, 18B are disposed in the respective partition walls 15, 16, and second inner casings 19A, 19B are disposed in the respective partition walls 15, 16. The first inner casings 18A, 18B have respective return blades 18a for guiding a fluid from the first stage impellers 3A, 3B to the second stage impellers 4A, 4B, and the second inner casings 19A, 19B have respective guides 19a which serve as guide vanes or volutes for guiding a fluid therethrough. The second inner casings 19A, 19B have respective socket-and-spigot joints which are fitted over a motor frame 24 of the canned motor 1. Seal members 20 are interposed between the first inner casings 18A, 18B and the partition walls 15, 16, respectively, for thereby sealing a suction pressure side (low pressure side) communicating with the suction windows 5a, 5b and a discharge pressure side (high pressure side) communicating with an annular space 40 (described later on) from each other. Liner rings 21 are mounted on radially inner ends, respectively, of the first inner casings 18A, 18B and the second inner casings 19A, 19B.

The motor frame 24 of the canned motor 1 comprises a substantially cylindrical outer frame casing 25 and a pair of axially spaced side frame members 26, 27 attached respectively to axial open ends of the outer frame casing 25. A cable housing 22 is welded to the outer frame casing 25. Leads extend outwardly from motor coils in the outer frame casing 25 and are electrically connected to power supply cables 46 in the cable housing 22. The power supply cables 46 are held by a cable connector 47 which is welded to the cable housing 22.

The canned motor 1 includes a stator 28 and a rotor 29 which are disposed in the motor frame 24. The rotor 29 is supported on the shaft 2 and housed in a cylindrical can 30 which is fitted in the stator 28.

Bearing housings 31, 32 are detachably fixed to the side frame members 26, 27, respectively, by clearance-fit socket-and-spigot joints and resilient O-rings 37, 38. The bearing housings 31, 32 hold respective radial bearings 33, 34 on their radially inner ends. A shaft sleeve 35 fitted over the shaft 2 is rotatably supported by the radial bearing 33, and a shaft sleeve 36 fitted over the shaft 2 is rotatably supported by the radial bearing 34.

As shown in FIGS. 1 and 2, an annular space 40 is defined between the outer cylindrical pump casing 5 and the motor frame 24. The outer cylindrical pump casing 5 has an opening 5c defined in its circumferential wall and held in communication with the annular space 40. A discharge nozzle 41 with a discharge port 41a defined therein is fixedly mounted on the outer cylindrical pump casing 5 around the opening 5c, and a discharge flange 42 is fixedly mounted on the discharge nozzle 41.

A procedure for fixing the canned motor 1 and the outer cylindrical pump casing 5 to each other will be described below with reference to FIG. 3.

First, as shown in FIG. 3, the side frame members 26, 27 and the cable housing 22 are welded to the outer frame casing 25, and a support 43 is welded to the outer frame casing 25, thus producing a motor frame assembly 50.

Then, the motor frame assembly 50 is inserted into the outer cylindrical pump casing 5, and the cable housing 22 is inserted into a hole 5d defined in the outer cylindrical pump casing 5.

Thereafter, a water drain pipe 45 having a notch 45a defined therein is inserted through a hole defined in the outer cylindrical pump casing 5 and pressed against the outer frame casing 25, and then the water drain pipe 45 is welded to the outer cylindrical pump casing 5. Since the end of the notch 45a bites into the outer frame casing 25, the outer frame casing 25 and the outer cylindrical pump casing 5 are securely fixed to each other.

Figure 4A:
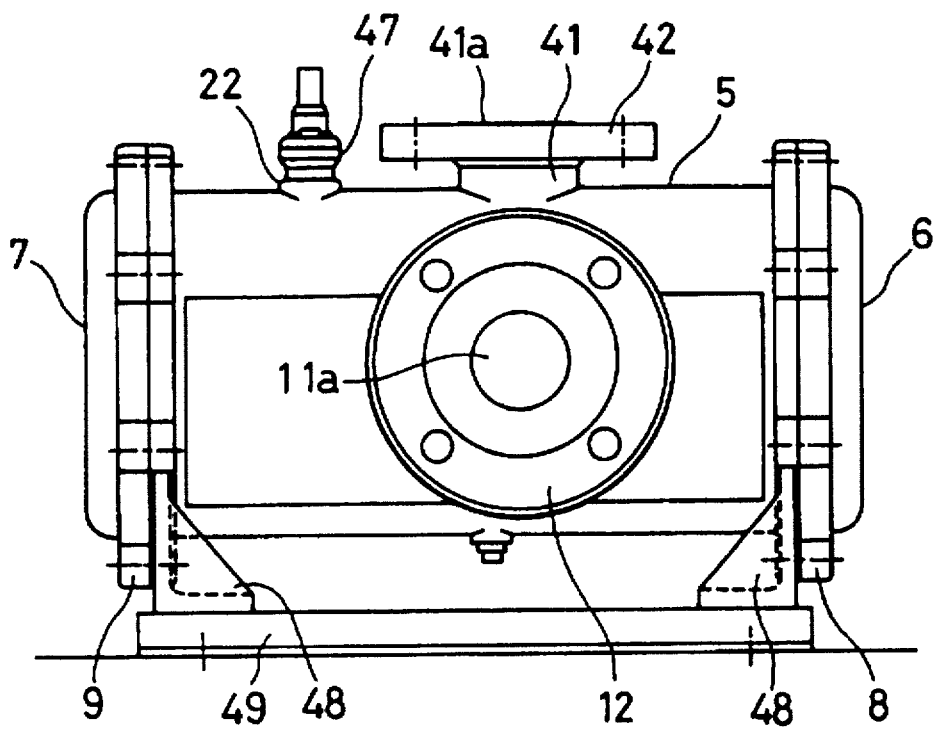
FIGS. 4A and 4B are front and side elevational views, respectively, of the full-circumferential flow pump according to the first embodiment.
Figure 4B:
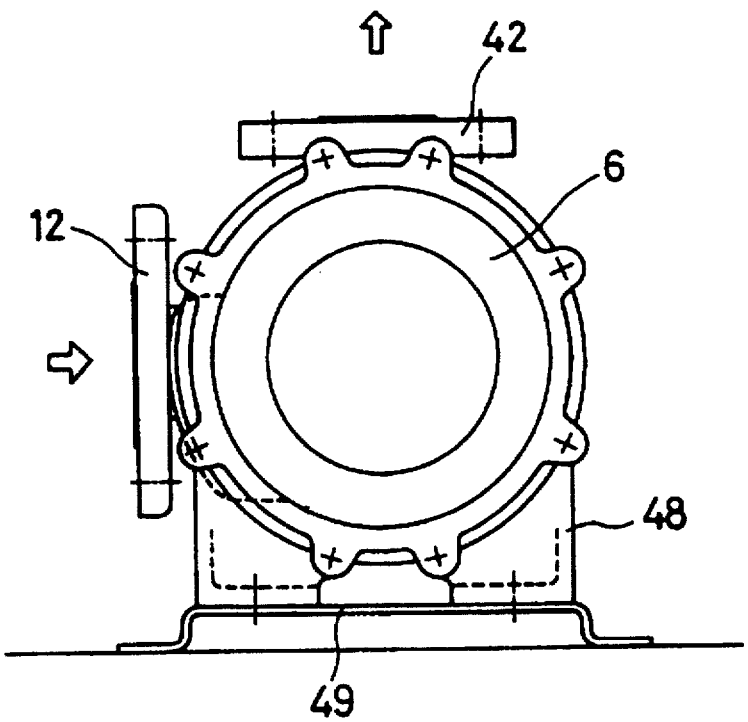

FIGS. 4A and 4B show the full-circumferential flow double-suction pump in front and side elevations, respectively. As shown in FIGS. 4A and 4B, the full-circumferential flow double-suction pump is of the side-top type where the suction port 11a is positioned on the side and the discharge port 41a on the top. Legs 48 fixedly mounted on a base 49 are secured to the flanges 8, 9 which interconnect the outer cylindrical pump casing 5 and the end covers 6, 7.

Operation of the full-circumferential flow double-suction pump which is of the above structure will be described below.

The fluid which is drawn in through the suction port 11a is divided by the suction case 10 into two fluid flows which are introduced into the pump assemblies through the suction windows 5a, 5b. The fluid flows introduced into the pump assemblies flow through the suction openings 15c, 16c into the first inner casings 18A, 18B and the second inner casings 19A, 19B in which the fluid flows are pressurized by the impellers 3A, 3B, 4A, 4B. The fluid flows discharged from the impellers 3A, 3B flow into the impellers 4A, 4B, from which the fluids flow radially outwardly through the guides 19a and then axially into the annular space or passage 40 defined between the outer cylindrical pump casing 5 and the motor frame 24. The fluid flow passing through the annular passage 40 merges in the middle of the annular passage 40 and is then discharged through the opening 5c of the outer cylindrical pump casing 5 and the discharge nozzle 41 from the discharge port 41a.

Since the outer frame casing 25 is surrounded entirely circumferentially by the fluid, the outer frame casing 25 is subject to a uniform pressure and free from strains or deformations. The partition walls 15, 16 mounted in the outer cylindrical pump casing 5 are effective in separating the interior space of the outer cylindrical pump casing 5 into the suction and discharge pressure sides in the pump which make radial and circumferential pressure distributions uniform in the outer cylindrical pump casing 5.

Inasmuch as the resilient seal members 17 are interposed between the inner circumferential surface of the outer cylindrical pump casing 5 and the outer circumferential surfaces of the partition walls 15, 16, the partition walls 15, 16 can be detached from the outer cylindrical pump casing 5 and the suction and discharge pressure sides are reliably separated from each other.

The detachable covers 6, 7 on the respective opposite ends of the outer cylindrical pump casing 5 allow the internal mechanism of the pump to be serviced without the piping's being detached. The canned-motor pump is mainly serviced at its slidable and rotatable components such as bearings, liner rings, etc., and, when the covers 6, 7 are removed, the rotatable components and the bearing assemblies can be dismounted even if the piping is not detached.

Because the full-circumferential flow pump is of the double-suction type, the fluid introduced into the pump is divided and handled by the two pump assemblies. The specific speed of the pump is represented by $Ns=1/(2)^{1/2}$, and each of the impellers 3A, 3B, 4A, 4B may be composed of substantially two-dimensional blades, which can easily be pressed to shape. In general, a motor for driving a pump can be smaller as it can rotate at higher speed. In the pump, head is proportional to the square of rotational speed, flow rate is proportional to rotational speed. Further, in the pump, head and flow rate are proportional to the square of an outer diameter of an impeller. Therefore, the motor and the pump can be smaller as they can rotate at higher speed.

However, as rotational speed of an impeller increases, increasing rate of head is larger than increasing rate of flow rate. As a result, Q-H curve shows a remarkably increasing tendency.

In the case where a single suction pump is operated at high speed, in order to satisfy large flow rate and low head, a specific speed Ns of the pump becomes very large. The specific speed Ns is represented as follows:

$$Ns=nQ^{1/2}/H^{3/4}$$

where H is head, Q is flow rate and n is rotational speed.

Figure 5A:
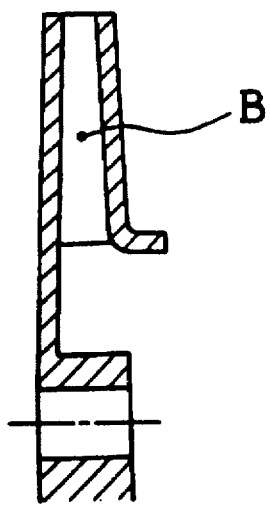
FIGS. 5A and 5B are a cross-sectional view, respectively, of the impeller.
Figure 5B:
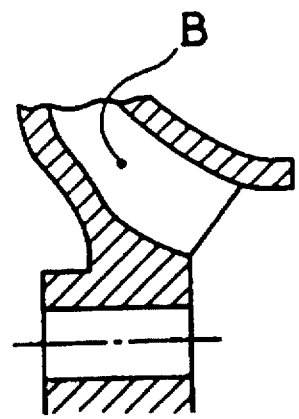
Figure 5C:
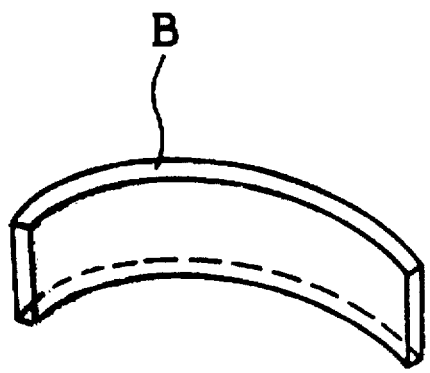
FIGS. 5C and 5D are a perspective view, respectively, of a blade.
Figure 5D:
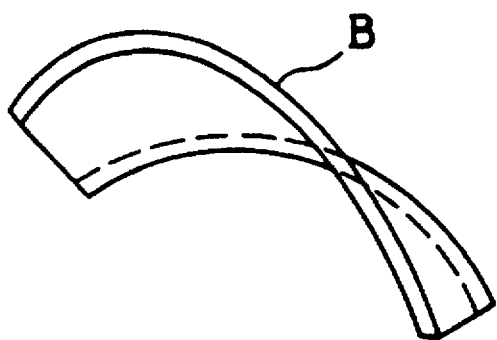

In general, an impeller having a small specific speed has such a profile as shown in FIG. 5A, and an impeller having a large specific speed has such a profile as shown in FIG. 5B. That is, the impeller having a small specific speed has two-dimensional blades B as shown in FIG. 5C. As a specific speed increases, the profile of the blade becomes three-dimensional as shown in FIG. 5D. The impeller having three-dimensional blades is troublesome in manufacturing, compared with the impeller having two-dimensional blades. Especially, in case of the impeller manufactured by press working, it is difficult to manufacture the impeller having three-dimensional blades.

However, since the impeller having a small specific speed can be used in the present invention, the impellers may be composed of substantially two-dimensional blades, which can easily be pressed to shape.

It is generally known that the higher the speed of the fluid at the inlet of the impellers, the poorer the suction performance of the pump at the time the pump is in pumping operation. The double-suction-type pump has high suction performance, however, because the introduced fluid is handled by the two pump assemblies.

The double-suction-type pump minimizes the load capacity of the bearings as axial thrusts produced by the pump are in balance. The balanced axial thrusts allow the bearing housings 31, 32 to be fixed to the motor frame 24 through a simple arrangement. Specifically, inasmuch as the bearing housings 31, 32 are fixed to the motor frame 24 through the clearance-fit socket-and-spigot joints and the resilient O-rings 37, 38, the radial bearings 33, 34 can automatically be centered, and components associated with the radial bearings 33, 34 are not required to be machined and assembled with high accuracy. The double-suction-type pump in this embodiment is advantageous particularly in a high speed range of 4000 r.p.m. or higher from the standpoints of hydrodynamic design considerations and axial thrust loads.

In this embodiment, the pressures in regions before and after the rotor chamber, i.e., the chamber in which the rotor 29 is positioned, are in complete equilibrium. Consequently, no slurry is drawn into the rotor chamber. If each of the impellers is equipped with pump-out blades behind its blades, then any slurry which approaches the back side of the impeller is forcibly repelled radially outwardly. Therefore, the pump is of a structure highly resistant to the slurry solution.

Furthermore, the outer frame casing 25 and the side frame members 26, 27 are welded before the outer cylindrical pump casing 5 is welded. Therefore, it is possible to extend the opposite ends of the outer cylindrical pump casing 5, install the suction case 10 on the outer cylindrical pump casing 5, and define the suction windows 5a, 5b in the outer cylindrical pump casing 5. It is thus unnecessary to provide a header pipe or the like for interconnecting the suction windows 5a, 5b.

FIGS. 6 through 10 show a full-circumferential flow pump according to the second embodiment of the present invention. The full-circumferential flow pump according to the second embodiment is of the double-suction type and is essentially the same as the full-circumferential flow pump according to the first embodiment which is illustrated in FIGS. 1 through 4A and 4B. Those parts shown in FIGS. 6 through 10 which are identical to those shown in FIGS. 1 through 4A and 4B are denoted by identical reference numerals, and will not be described in detail below.

Figure 6:
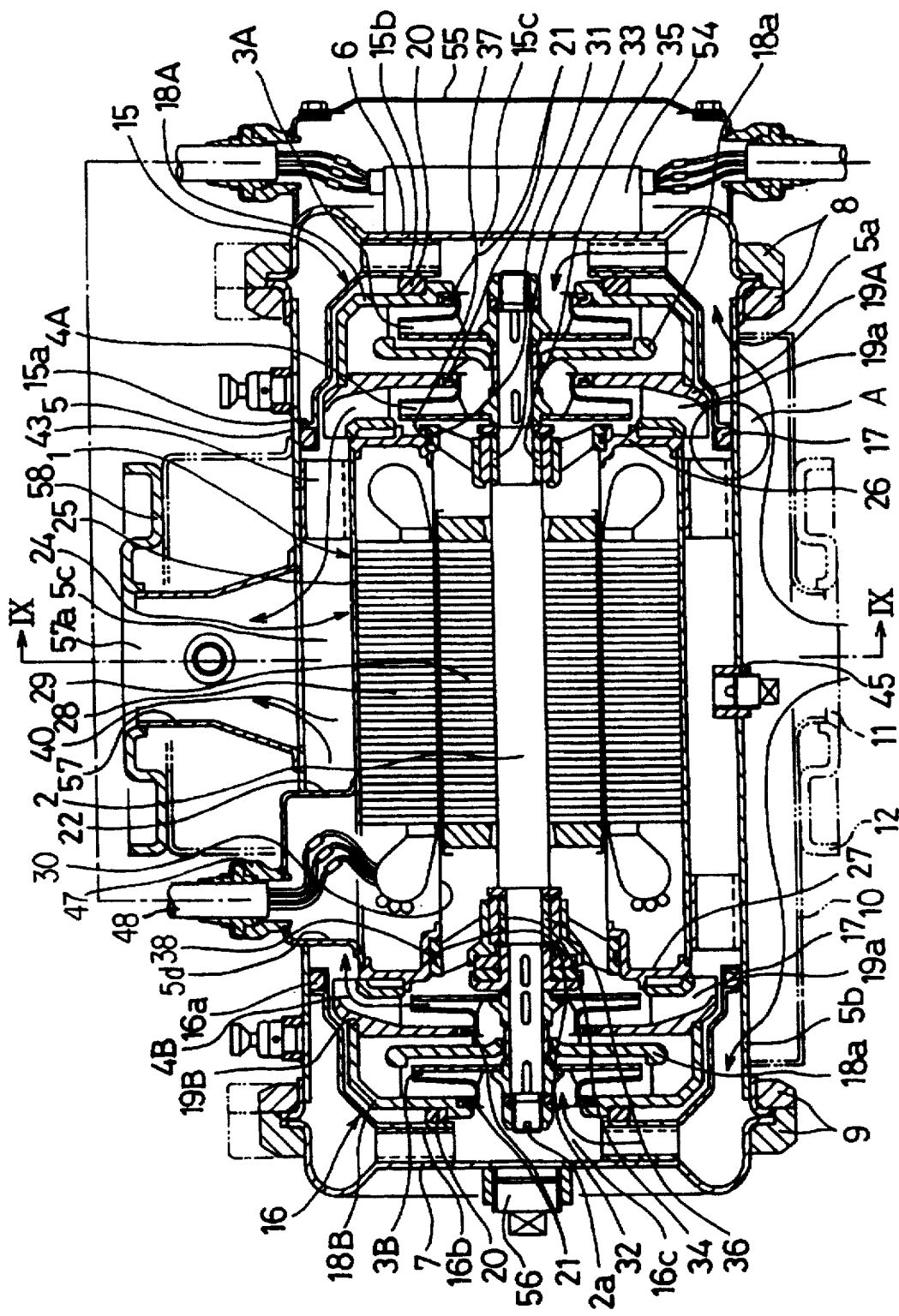
FIG. 6 is a longitudinal cross-sectional view of a full-circumferential flow pump according to a second embodiment of the present invention.
Figure 7A:
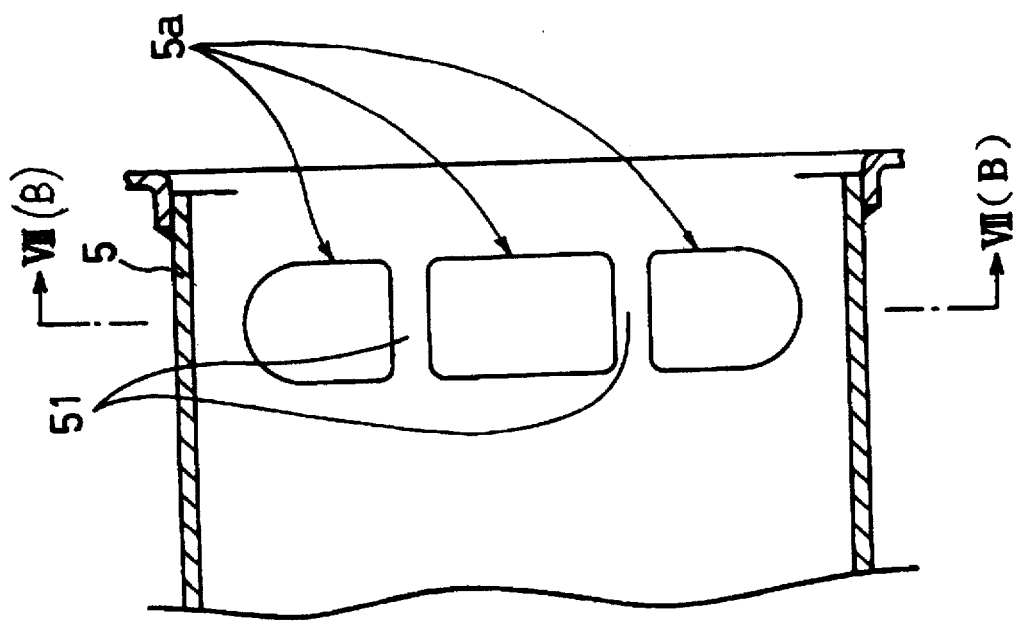
FIG. 7A is a fragmentary longitudinal cross-sectional view of an outer cylindrical pump casing of the full-circumferential flow pump according to the second embodiment.
Figure 7B:
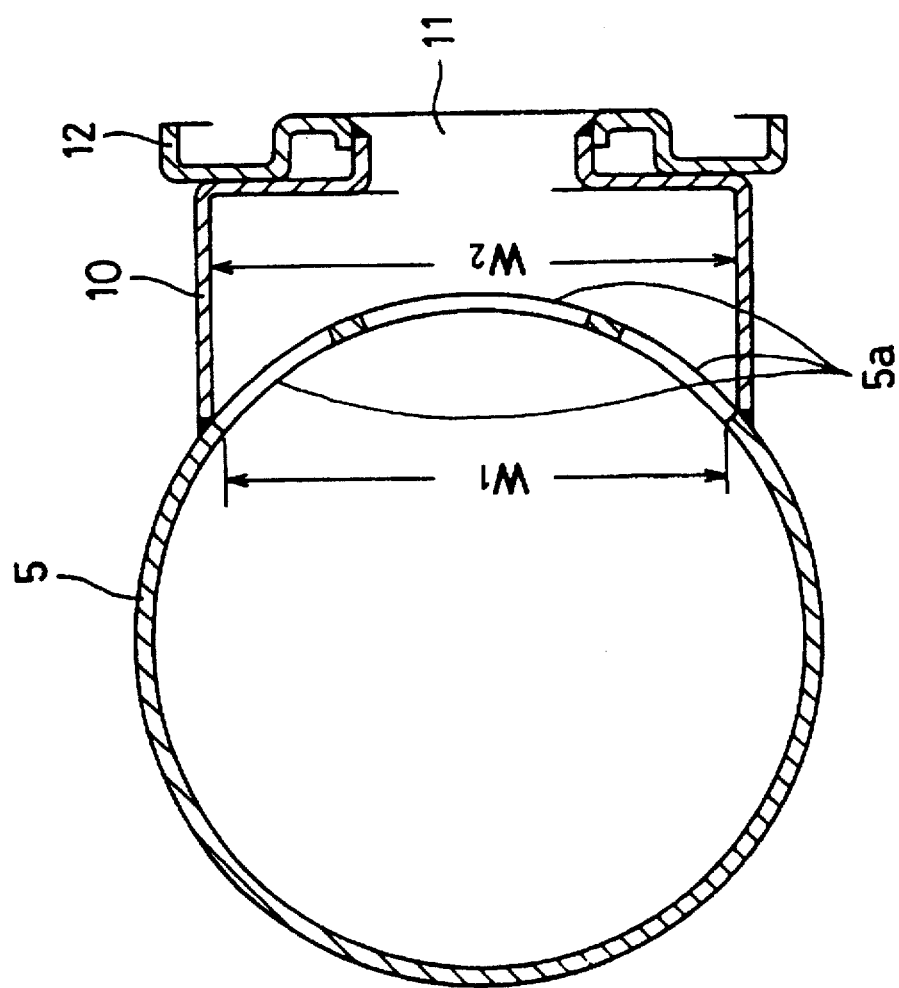
FIG. 7B is a cross-sectional view taken along line VII(B)—VII(B) of FIG. 7A.

According to the second embodiment, as shown in FIGS. 6 and 7A, the outer cylindrical pump casing 5 has axial bars 51 axially extending across each of the suction windows 5a, 5b defined in the outer cylindrical pump casing 5 (only the suction window 5a is shown in FIG. 7A). The axial bars 51 permit the partition walls 15, 16 with the seal members 17 installed thereon to be easily inserted into the outer cylindrical pump casing 5 over the suction windows 5a, 5b. In order to prevent air from being trapped in the suction case 10, the suction windows 5a, 5b have a circumferential width $W_1$ substantially equal to the width $W_2$ of the suction case 10, as shown in FIG. 7B, so that no air will be trapped in the suction case 10.

Figure 8:
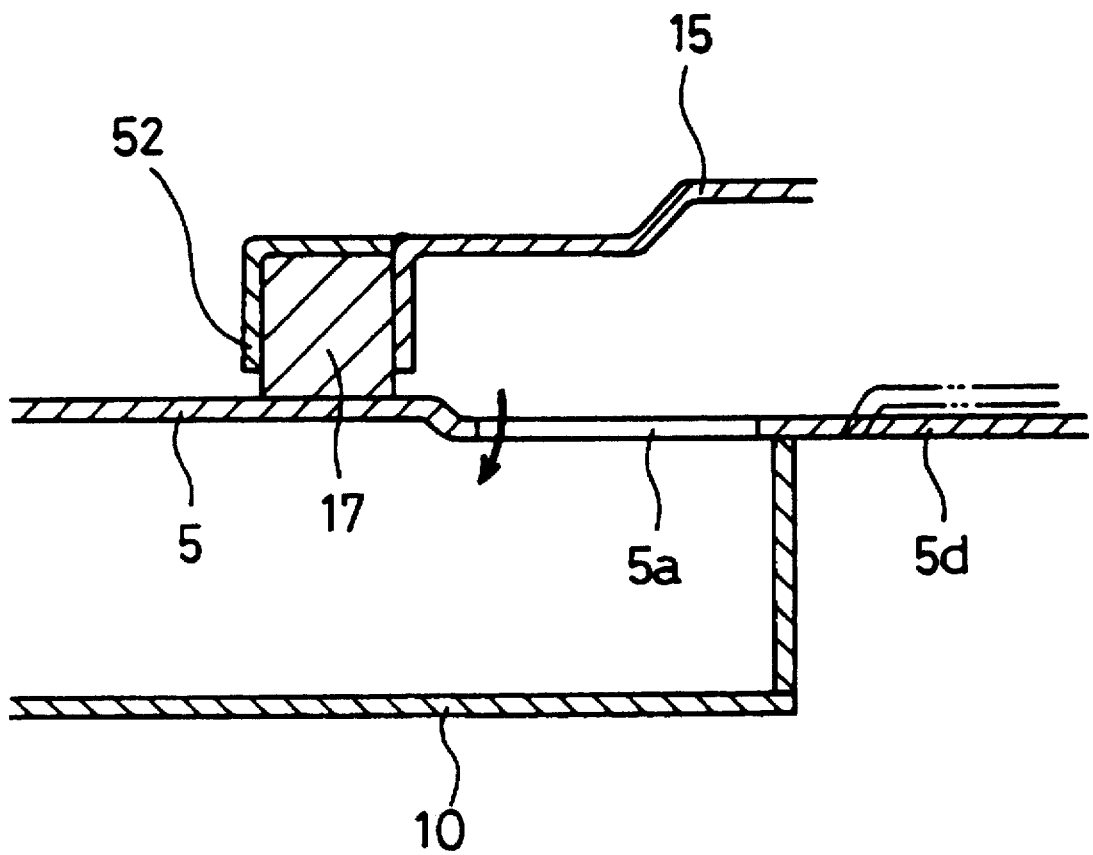
FIG. 8 is an enlarged cross-sectional view of an encircled region A of the full-circumferential flow pump shown in FIG. 6.

As shown in FIG. 8, a stopper 52 is attached to the distal end of each of the partition walls 15, 16 (only the partition wall 15 is shown in FIG. 8) to hold the seal member 17 against accidental dislodgment. The outer cylindrical pump casing 5 has enlarged casing portions 5d (only one enlarged casing portion 5d is shown in FIG. 8) on the suction pressure side for also allowing the partition walls 15, 16 with the seal members 17 installed thereon to be easily inserted into the outer cylindrical pump casing 5 over the suction windows 5a, 5b. The enlarged casing portions 5d prevent the suction windows 5a, 5b from being deformed in the direction indicated by the arrow in FIG. 8 owing to the difference between pressures inside and outside of the outer cylindrical pump casing 5. The enlarged casing portions 5d are further effective in keeping the outer cylindrical pump casing 5 cylindrical in shape and strong in structure.

According to the second embodiment, as shown in FIG. 6, a frequency converter 54 is fixed to an outer surface of the cover 6 which closes one end of the outer cylindrical pump casing 5, and is covered with a cover 55. Since the frequency converter 54 is fixed to the cover 6 which is held in contact with the fluid being handled, the frequency converter 54 can efficiently be cooled. Highly integrated circuits such as a frequency converter are generally susceptible to external forces or vibrations. The frequency converter 54 is more reliable and resistant to damage by being mounted on the cover 6 which is subject to only the suction pressure of the pump, rather than being mounted on the outer circumferential surface of the outer cylindrical pump casing 5 which is subject to and can be deformed by the discharge pressure of the pump.

A plug 56, which may be removed for the user to confirm the manual rotatability of the rotatable assembly of the pump, is detachably mounted on the cover 7 which closes the other end of the outer cylindrical pump casing 5. The plug 56 allows the user to confirm the manual rotatability of the rotatable assembly without detaching the cover 7. Specifically, the user removes the plug 56, inserts the forward end of a screwdriver into a slot 2a defined in the end of the shaft 2, tries to turn the screwdriver to confirm that the rotatable assembly can be rotated, and thereafter attaches the plug 56 again.

Figure 9:
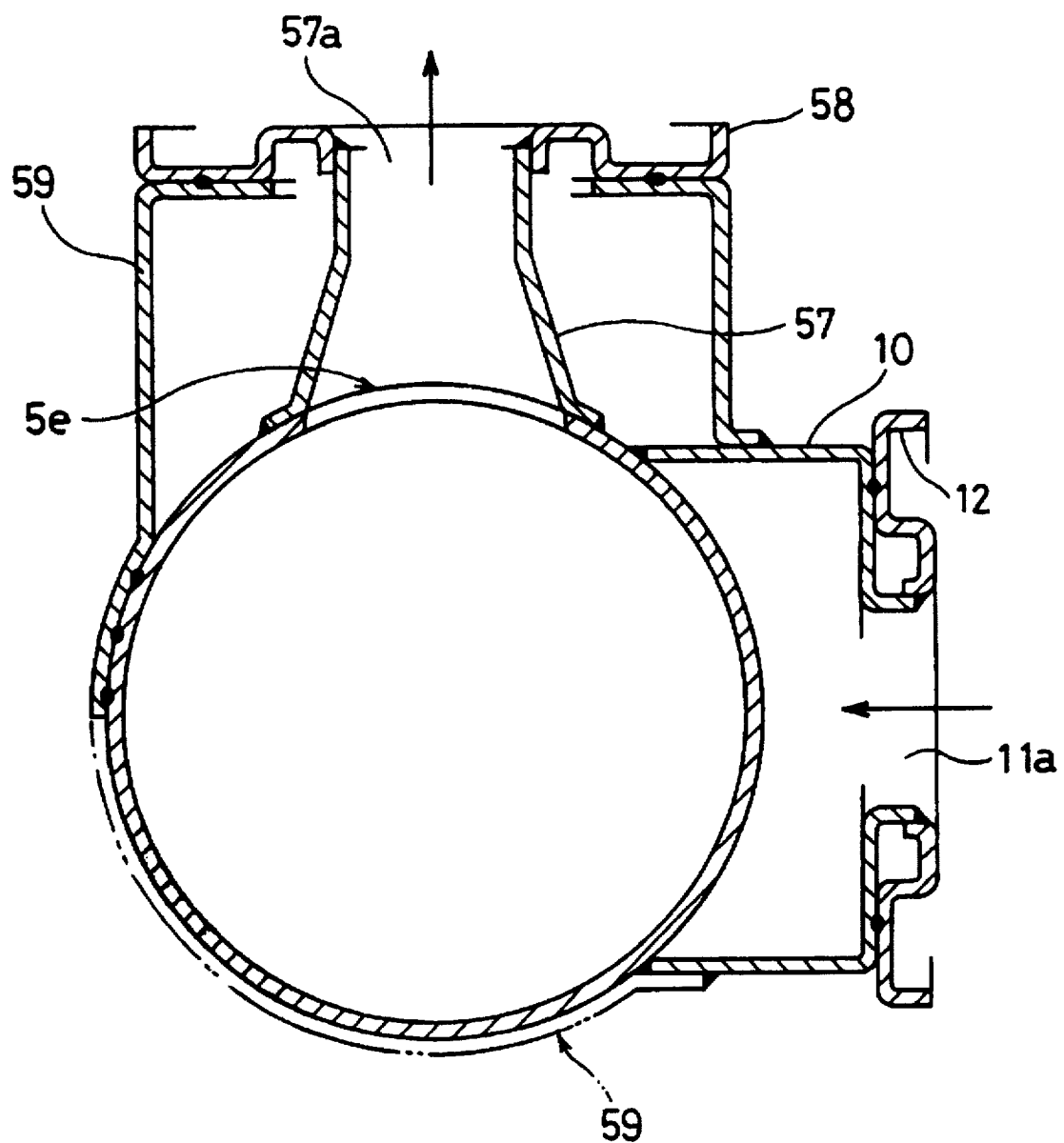
FIG. 9 is a cross-sectional view taken along line IX—IX of FIG. 6.

As shown in FIGS. 6 and 9, the outer cylindrical pump casing 5 has an opening 5e defined in its circumferential wall and held in communication with the annular space 40, and a discharge nozzle 57 is sealingly welded to the circumferential wall of the outer cylindrical pump casing 5 in registry with the opening 5e. The discharge nozzle 57 has a discharge port 57a defined therein, and a discharge flange 58 is sealingly welded to the discharge nozzle 57 near the discharge port 57a. The discharge flange 58 is welded to a reinforcing member 59 which is in turn welded to an outer circumferential surface of the outer cylindrical pump casing 5. The discharge flange 58 and the reinforcing member 59 thus welded protect the discharge nozzle 57 from external forces due to a piping load or the like. Since external forces that are applied to the pump are absorbed by the outer cylindrical pump casing 5, external forces which would otherwise damage the pump are not directly applied to the outer frame casing 25 and the stator 28. Even in the absence of the reinforcing member 59, no external forces will be transmitted to the outer frame casing 25 as the pump is a fully double-walled structure unlike the conventional pump. As indicated by the phantom line in FIG. 9, the reinforcing member 59 may be mounted on the entire circumferential wall of the outer cylindrical pump casing 5 to prevent the outer cylindrical pump casing 5 from being expanded radially outwardly under the internal pressure of the pump.

Figure 10:
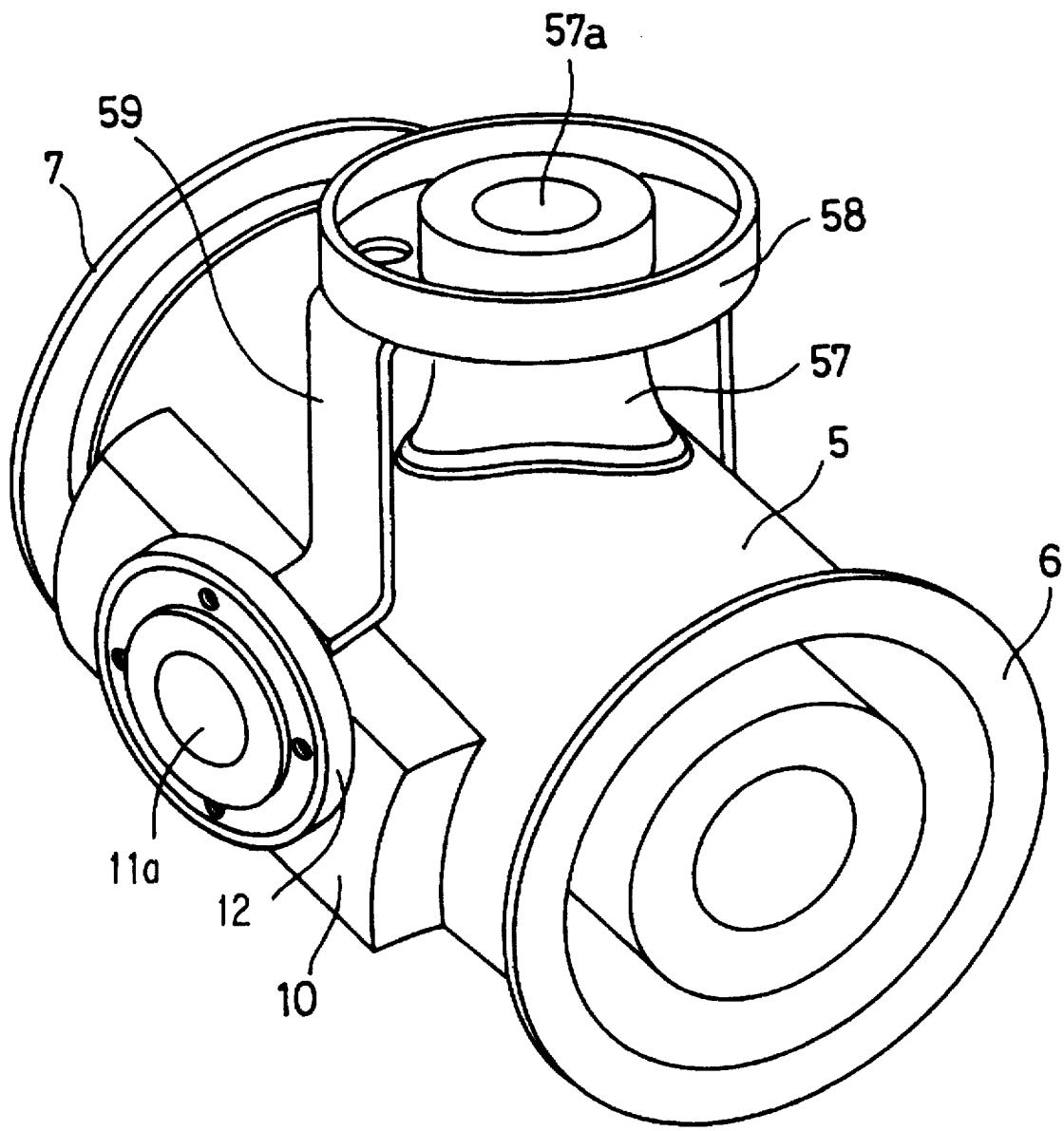
FIG. 10 is a perspective view of the full-circumferential flow pump shown in FIG. 6.

FIG. 10 shows in perspective the full-circumferential flow double-suction pump shown in FIG. 6. As shown in FIG. 10, the full-circumferential flow double-suction pump is of the side-top type where the suction port 11a is positioned on the side and the discharge port 57a on the top.

Figure 11:
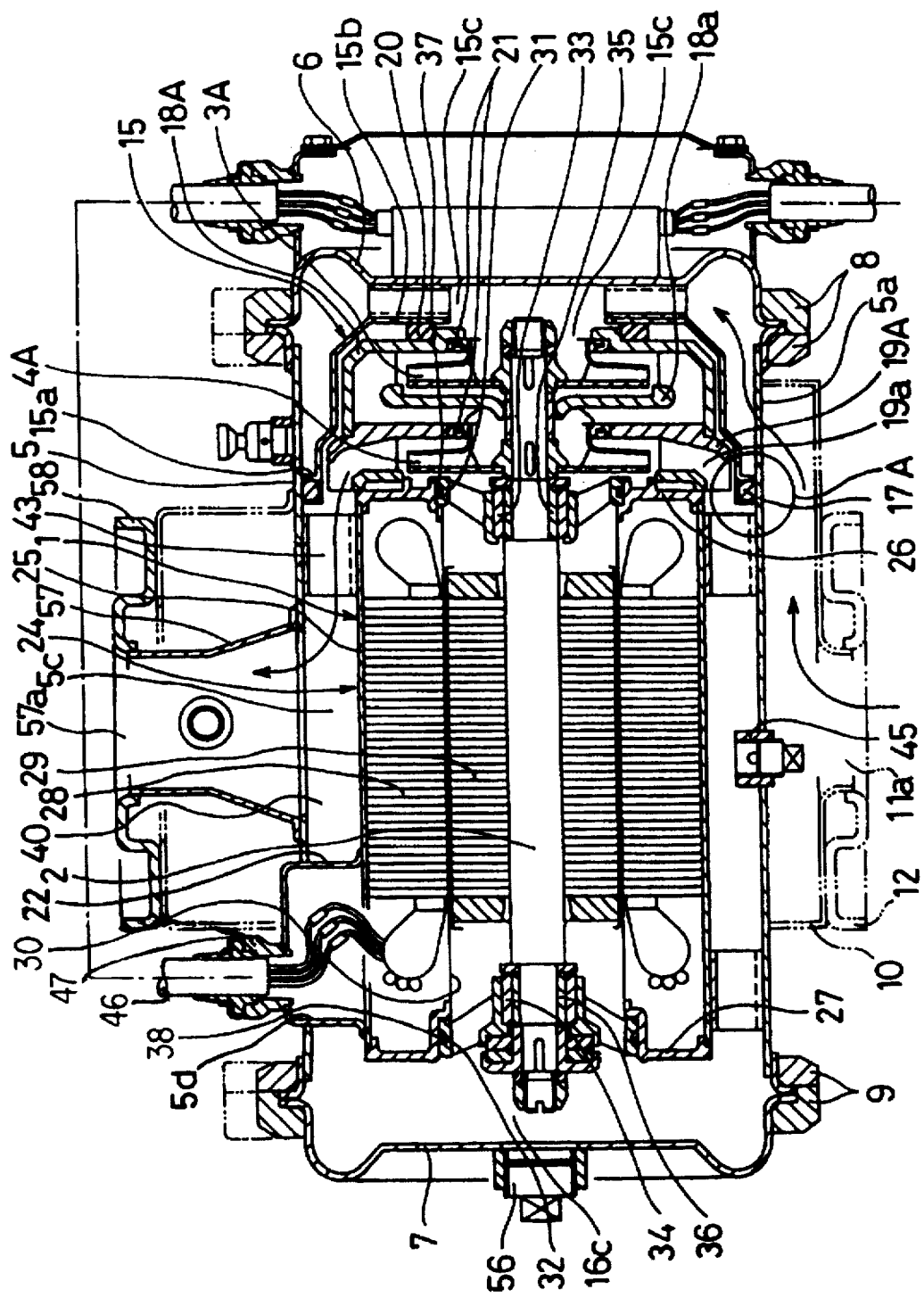
FIG. 11 is a longitudinal cross-sectional view of a full-circumferential flow pump according to the third embodiment of the present invention.

FIG. 11 shows a full-circumferential flow pump according to the third embodiment of the present invention. The full-circumferential flow Dump according to the third embodiment is of the single-suction type. Those parts shown in FIG. 11 which are identical to those shown in FIG. 6 are denoted by identical reference numerals, and will not be described in detail below.

As shown in FIG. 11, the full-circumferential flow single-suction pump according to the third embodiment has a canned motor 1 disposed centrally therein. The canned motor 1 includes a shaft 2 supporting on one end thereof a pair of impellers 3A, 4A each having an axially outwardly open suction region. No impellers are mounted on the opposite end of the shaft 2, and no partition walls are disposed in the outer cylindrical pump casing 5 around the other end of the shaft 2. The other details of the pump shown in FIG. 11 are substantially the same as those of the pump shown in FIG. 6.

The full-circumferential flow single-suction pump shown in FIG. 11 operates as follows: The fluid which is drawn in through the suction port 11a is introduced into the pump assembly through the suction window 5a in the suction case 10. The fluid introduced into the pump assembly flows through the suction opening 15c into the inner casings 18A, 19A in which the fluid is pressurized by the impellers 3A, 4A. The fluid discharged from the impeller 3A flows into the impeller 4A, from which the fluid flows radially outwardly through the guide 19a and then axially into the annular space or passage 40 defined between the outer cylindrical pump casing 5 and the motor frame 24. The fluid is then discharged through the discharge nozzle 57 from the discharge port 57a. Except for its inherent operational features and advantages, the full-circumferential flow single-suction pump shown in FIG. 11 operates in the same way, and offers the same advantages, as the full-circumferential flow double-suction pumps shown in FIGS. 1 through 10.

As described above, the full-circumferential flow pumps according to the preferred embodiments of the present invention offer the following advantages:

Since the outer frame casing is surrounded by the fluid to be discharged from the pump, the outer frame casing is subject to a uniform pressure and free from irregular strains and deformations. The partition walls in the outer cylindrical pump casing separate the interior space of the outer cylindrical pump casing into the suction pressure side and the discharge pressure side in the pump, making radial and circumferential pressure distributions uniform in the outer cylindrical pump casing.

Because the resilient seal members such as rubber are interposed between the inner circumferential surface of the outer cylindrical pump casing and the outer circumferential surfaces of the partition walls, the partition walls can be detached from the outer cylindrical pump casing and the suction and discharge pressure sides are reliably separated from each other.

The detachable covers on the respective opposite ends of the outer cylindrical pump casing allow the internal mechanism of the pump to be serviced without the piping's being detached. The canned-motor pump is mainly serviced at its slidable and rotatable components such as bearings, liner rings, etc., and, when the covers are removed, the rotatable components and the bearing assemblies can be dismounted even if the piping is not detached.

In the case where the full-circumferential flow pump is of the double-suction type, the fluid introduced into the pump is divided and handled by the two pump assemblies. The specific speed of the pump is thus represented by $Ns=1/(2)^{1/2}$, and each of the impellers may be composed of substantially two-dimensional blades, which can easily be pressed to shape.

Inasmuch as the flanges interconnecting the outer cylindrical pump casing and its end covers are supported on the legs and the fluid flows fully around the motor, the pump can be cooled efficiently, and hence the motor can be reduced in size.

The fluid being handled flows freely into and out of the rotor chamber. The motor can be cooled by the fluid and hence can be of a relatively small size. Since it is not necessary to provide a water seal between the rotor chamber and the pump assemblies and the axial thrusts are in equilibrium, the radial bearings may be fixed to the motor frame by a simple structure. Specifically, inasmuch as the bearing housings are fixed to the motor frame through the clearance-fit socket-and-spigot joints and the resilient O-rings, the radial bearings can automatically be centered, and components associated with the radial bearings are not required to be machined and assembled with high accuracy.

The pump assemblies disposed on the opposite sides of the motor may be of different flow rates or capacities. For example, if pump assemblies having a flow rate ratio of 1:1.6 are available for use in various combinations, then it is possible to manufacture three pumps having a flow rate of 2(1+1), 2.6(1+1.6), and 3.2(1.6+1.6).

Because the pressures in regions before and after the rotor chamber are in complete equilibrium, no slurry is drawn into the rotor chamber. If each of the impellers is equipped with pump-out blades, then any slurry which approaches the back side of the impeller is forcibly repelled radially outwardly. Therefore, the full-circumferential flow pump is highly resistant to the slurry solution.

As no air is trapped in the suction case, the pump does not suffer any problems in operation which would otherwise be caused by trapped air. Since it is unnecessary to provide a header pipe or the like for interconnecting the suction windows, the pump assemblies can be serviced without the piping's being detached.

Furthermore, in the case where a multi-stage double-suction pump is constructed, an outer circumferential passage may be defined using a partition wall, and a suction cover may be disposed over the outer circumferential passage. Such an arrangement makes it possible to reduce the entire length of the multi-stage double-suction pump.

Next, another embodiment of the present invention will be described below with reference to FIG. 12.

Figure 12:
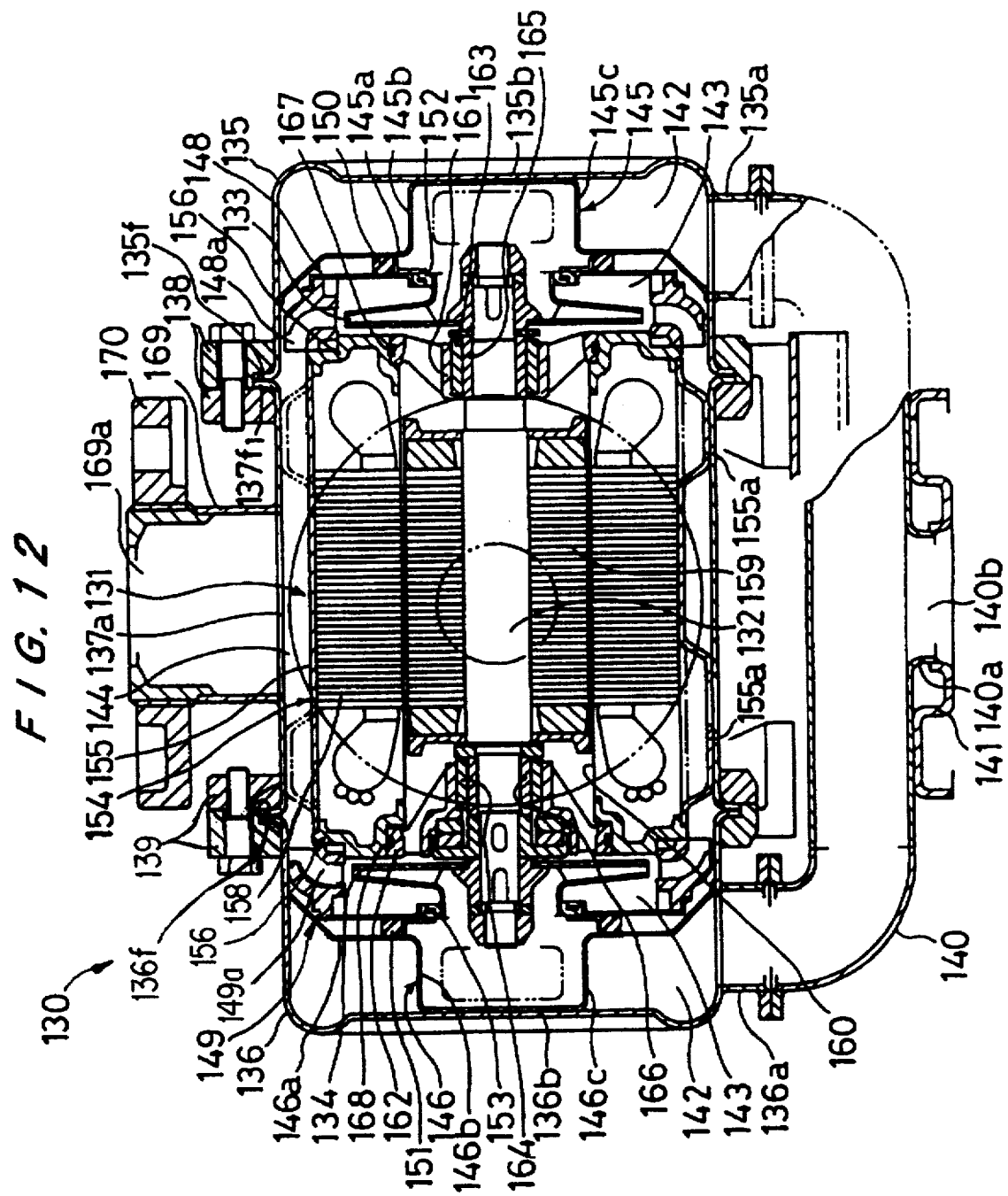
FIG. 12 is a vertical cross-sectional view of a double-suction pump according to the fourth embodiment of the present invention.

FIG. 12 shows in cross section a full-circumferential flow double-suction pump having a pump casing made of sheet metal. As shown in FIG. 12, a full-circumferential flow double-suction pump 130 is provided with a canned (sealed) motor 131 at the central portion thereof. The canned motor 131 has a main shaft 132 having two ends to which impeller 133, 134 are fixed. The impellers 133, 134 each cooperate with a suction port which is open outwardly of the main shaft 132. Cylindrical cup-shaped casings 135, 136 are provided to house the impellers 133, 134, respectively. These casings 135, 136 are formed by pressing steel plate such as stainless steel. These casings 135, 136 are connected to an outer cylinder 137. The casing 135, the casing 136, and the outer cylinder 137 have respective flanges 135f, 136f, 137$f_1$, 137$f_2$ extending radially outwardly from open ends thereof. The adjacent flanges 135f, 137$f_1$ of the casing 135 and the outer cylinder 137 are clamped by loose flanges 138, 138. Similarly, the adjacent flanges 136f, 137$f_2$ of the casing 136 and the outer cylinder 137 are clamped by loose flanges 139, 139.

The casings 135, 136 have respective suction nozzles 135a and 136a. The suction nozzle 135a and the suction nozzle 136a are connected to each other through a header pipe 140. The header pipe 140 has a suction portion 140a at the central portion thereof. The suction portion 140a has a suction port 140b and a suction flange 141 fixed thereto.

The casings 135, 136 are in the form of a substantially cylindrical cup-shaped outer casing having a bottom 135b, 136b on one axial end and an opening in the other axial end. The casings 135, 136 have a partition wall 145 and a partition wall 146, respectively. The partition walls 145, 146 divide the interior spaces of the casings 135, 136 into a suction chamber 142 and a hydrocasing chamber 143, respectively. The partition wall 145 has a radial portion 145a whose outer peripheral edge is welded to an inner surface of the cylindrical side wall of the casing 135. The partition wall 146 has a radial portion 146a whose outer peripheral edge is welded to an inner surface of the cylindrical side wall of the casing 136. The partition walls 145, 146 also have a central cylindrical portion 145b and a central cylindrical portion 146b, respectively. The central cylindrical portions 145b, 146b axially extend from the radial portions 145a, 146a, respectively. The cylindrical portion 145b is connected to the bottom 135b of the casing 135. The cylindrical portion 146b is connected to the bottom 136b of the casing 136. The cylindrical portions 145b, 146b have a plurality of rectangular suction holes 145c, 146c, respectively defined in their cylindrical side walls at circumferentially spaced positions.

The full-circumferential double-suction pump also has inner casings 148, 149 disposed inwardly of the respective casings 135, 136. The inner casings 148, 149 include a guide device 148a, 149a, respectively defining guide vanes or a volute. The inner casings 148, 149 are fitted over a motor frame side plate 156, 157, respectively, in a socket-and-spigot joint. A resilient seal 150 is disposed in a gap defined between the inner casing 148 and the partition wall 145 to seal a suction side (low-pressure side) in the pump from a discharge side (high-pressure side) in the pump. A resilient seal 151 is disposed in a gap defined between the inner casing 149 and the partition wall 146 to seal a suction side (low-pressure side) in the pump from a discharge side (high-pressure side) in the pump. A liner ring 152 is provided on the inner end of the inner casing 148, with a slight clearance defined between the liner ring 152 and the impeller 133. A liner ring 153 is provided on the inner end of the inner casing 149, with a slight clearance defined between the liner ring 153 and the impeller 134.

The motor frame 154 of the canned motor 131 comprises a cylindrical frame outer barrel 155, frame side plates 156, 157 provided on both sides of the frame outer barrel 155. As shown in FIG. 12, the frame outer barrel 155 has a plurality of ribs 155a projecting radially outwardly from an outer circumferential surface thereof. The ribs 155a are integrally formed with the motor frame outer barrel 155 by embossing, and have outer surfaces fitted in and spot-welded or otherwise joined to the outer cylinder 137 of the pump casing.

The canned motor 131 has a stator 158 and a rotor 159 that are disposed in the motor frame outer barrel 155. The rotor 159 is supported on the main shaft 132 and disposed radially inwardly of the stator 158. A cylindrical can 160 is fitted in the stator 158 which is fixedly positioned in the motor frame outer barrel 155.

A bearing housing 161 is detachably fastened to the frame side plate 156, with a resilient O-ring 167 being interposed between the bearing housing 161 and the frame side plate 156. A bearing housing 162 is detachably fastened to the frame side plate 157, with a resilient O-ring 168 being interposed between the bearing housing 162 and the frame side plate 157. The bearing housing 161 and the frame side plate 156 are joined to each other by a socket-and spigot joint with a clearance fit with the O-ring 167 disposed therein. The bearing housing 162 and the frame side plate 157 are joined to each other by a socket-and spigot joint with a clearance fit with the O-ring 168 disposed therein. The bearing housings 161, 162 support radial bearings 163, 164 on their radially inner surfaces, respectively. Shaft sleeves 165, 166 fitted over opposite ends of the main shaft 132 are rotatably supported by the radial bearings 163, 164, respectively.

An annular fluid passage 144 is defined between the motor frame 154 of the canned motor 131 and the outer cylinder 137 having an opening 137a. A discharge nozzle 169 is fixed to the outer cylinder 137 in the vicinity of the opening 137a. The discharge nozzle 169 has a discharge port 169e and a discharge flange 170 fixed thereto.

The full-circumferential-flow double-suction pump shown in FIG. 12 operates as follows: A fluid drawn from the suction port 140b is divided so as to flow right and left by the header pipe 140 and flows into the casings 135, 136 from the suction nozzles 135a, 136a. A fluid flows through the suction holes 145c, 146c into the impellers 133, 134. The fluid is then radially outwardly discharged by the impellers 133, 134, and directed by the guide devices 148a, 149a to flow axially through an annular fluid passage 144 radially defined between the outer cylinder 137 and the motor frame outer barrel 155 of the canned motor 131. The fluid merges in the middle of the annular fluid passage 144. Thereafter, the fluid passes through the opening 137a and is discharged from the discharge nozzle 169.

In this embodiment, since the interior spaces of the substantially cylindrical cup-shaped pump casings 135, 136 are divided into the suction chamber 142 and the hydrocasing chamber 143 by the partition walls 145, 146, respectively, the pump casings 135, 136 are of a simple configuration that does not depend on the hydrocasing chamber 143. Therefore, the pump casings 135, 136 can easily be pressed to desired shape, and the suction chamber 142 and the hydrocasing chamber 143 can be separated from each other by the partition walls 145, 146 that are also a simple shape. The number of parts used is relatively small, and they can easily be welded together.

The partition walls 145, 146 may thus be simplified in shape and easily be pressed to shape. The partition walls 145, 146 provide a desired level of rigidity against the pressure difference between the suction and discharge sides.

Figure 13:
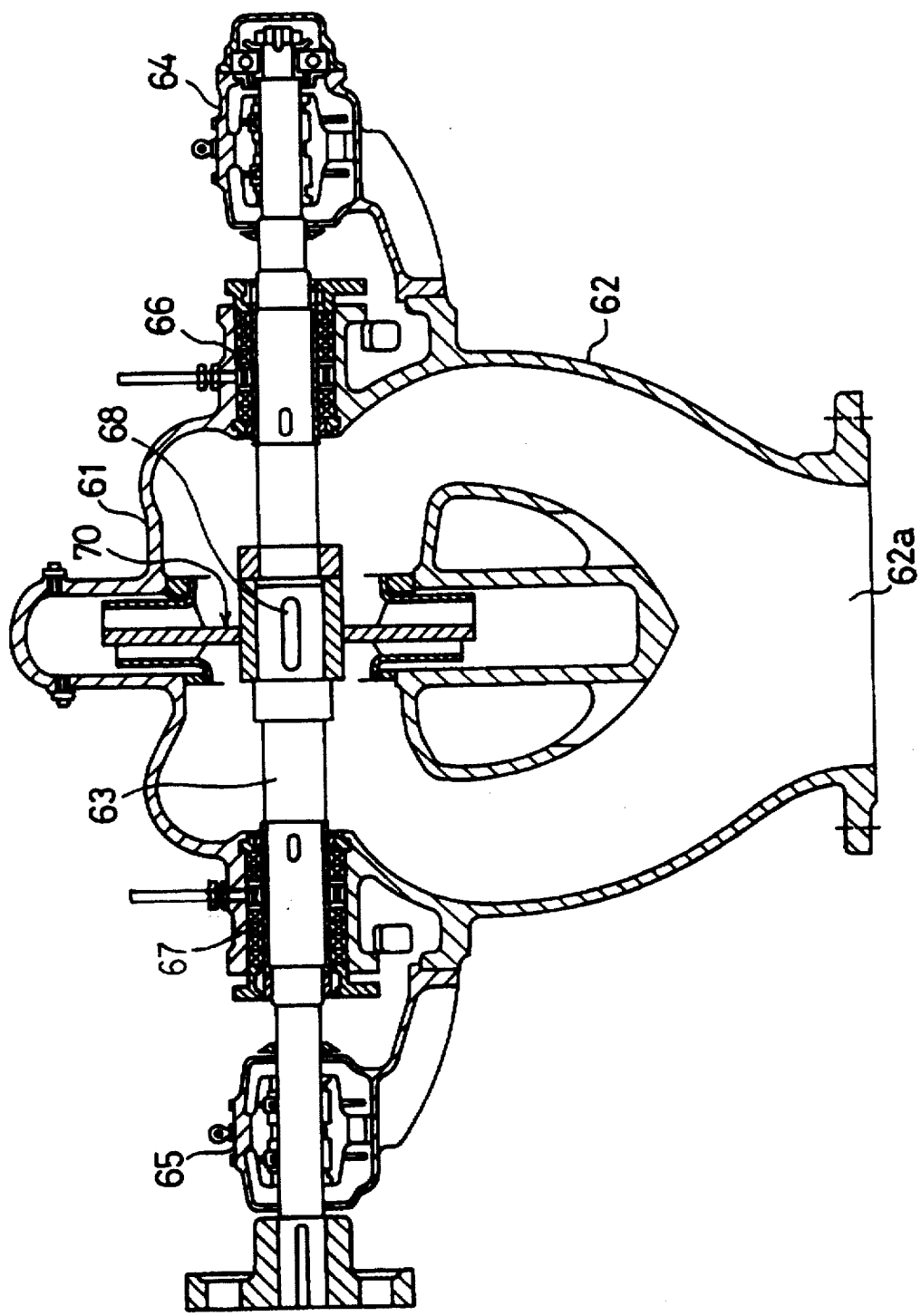
FIG. 13 is a cross-sectional view of a double-suction pump according to the fifth embodiment of the present invention.

Next, another type of double-suction pump will be described below with reference to FIGS. 13 through 15. FIG. 13 shows a double-suction pump according to the fifth embodiment of the present invention. As shown in FIG. 13, a double-suction pump has a casing comprising an upper casing 61 and a lower casing 62. The lower casing 62 has a suction port 62a and a discharge port (not shown). A double-suction impeller 70 is disposed in the casing. The double-suction impeller 70 is fixed to a shaft 63 which is rotatablly supported at both ends thereof by bearings 64 and 65. Sealing devices 66 and 67 are provided at the portions where the shaft 63 pierces through the casing.

Next, the double-suction impeller 70 in the double-suction pump will be described in detail with reference to FIG. 14. As shown in FIG. 14, the double-suction impeller 70 has a main plate 71 whose central portion has a boss 71a for transmitting a driving force from the shaft 63 to the impeller 70. The boss 71a is formed with a key way 71b into which a key 68 (see FIG. 13) is inserted, whereby a driving force is transmitted from the shaft 63 to the boss 71a. A plurality of A-blades 74 and an A-side plate 72 are provided on one side of the main plate 71. The outer diameter of the main plate 71 is equal to the outer diameters of the A-blades 74 and A-side plate 72.

A plurality of B-blades 75 and a B-side plate 73 are provided on the other side of the main plate 71. The outer diameter of the B-blades 75 is equal to the outer diameter of the B-side plate 73, and the outer diameters of the B-blades 75 and the B-side plate 73 are smaller than the outer diameter of the main plate 71. The span of the A-blades 74 is longer than that of the B-blades 75, that is, $B_{2A} > B_{2B}$ in FIG. 14. Liner rings 76 and 77 are provided around the A-side plate 72 and the B-side plate 73 with a slight clearance, respectively.

The A-side plate 72, the A-blades 74 and the main plate 71 jointly constitute an impeller element A, and the B-side plate 73, the B-blades 75 and the main plate 71 jointly constitute an impeller element B. In this specification, an impeller element is defined as a rotating element for imparting energy to a fluid to be pumped. The outer diameter $D_{2A}$ of the impeller element A is larger than the outer diameter $D_{2B}$ of the impeller element B, that is, $D_{2A} > D_{2B}$ in FIG. 14. Further, the diameter $D_{1A}$ of suction port of the impeller element A is larger than the diameter $D_{1B}$ of the suction port of the impeller element B, that is, $D_{1A} > D_{1B}$ in FIG. 14. In this embodiment, the main plate 71, the A-blades 74, the B-blades 75, the A-side plate 72 and the B-side plate 73 are manufactured by press working, and the double-suction impeller 70 is manufactured by welding such components.

In this embodiment, the exit angle of the A-blades 74 is different from that of the B-blades 75 or the number of the A-blades 74 is different from the number of the B-blades 75 so that shutoff head (no-discharge head) of the impeller element A is equivalent to that of the impeller element B. This is because if the shutoff head of the impeller elements A and B is different from each other, backflow from the impeller element A to the impeller element B or vice versa occurs due to unbalanced pressure at an operating point of small flow rate.

Figure 15A:
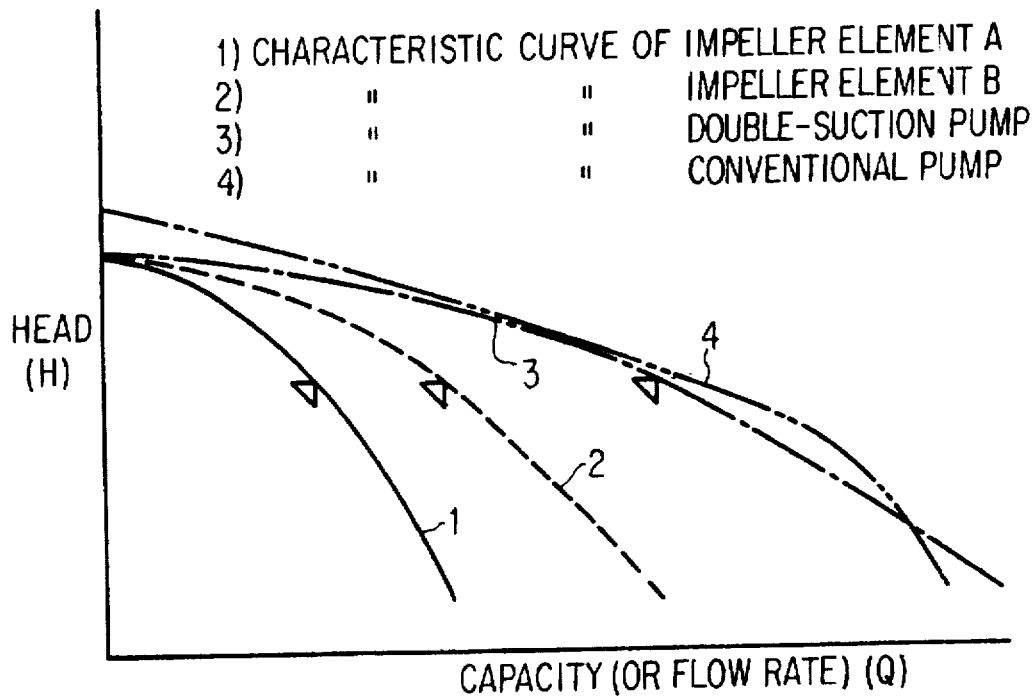
FIG. 15A is a graph showing the relationship between capacity (Q) and head (H) according to the fifth embodiment of the present invention.
Figure 15B:
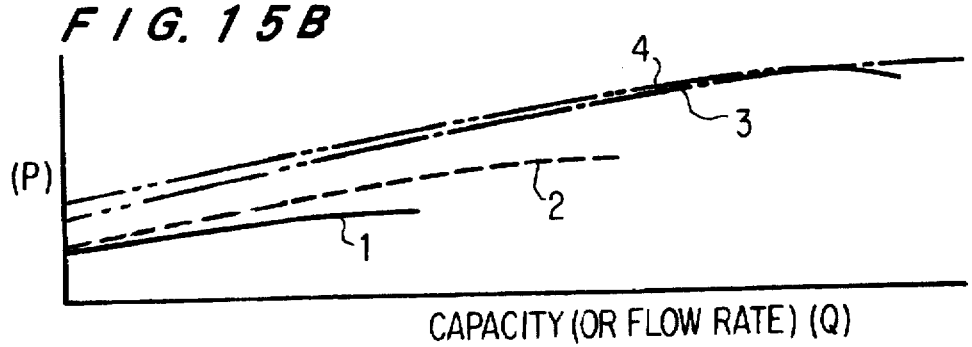
FIG. 15B is a graph showing the relationship between capacity (Q) and power (P) according to the fifth embodiment of the present invention.
Figure 15C:
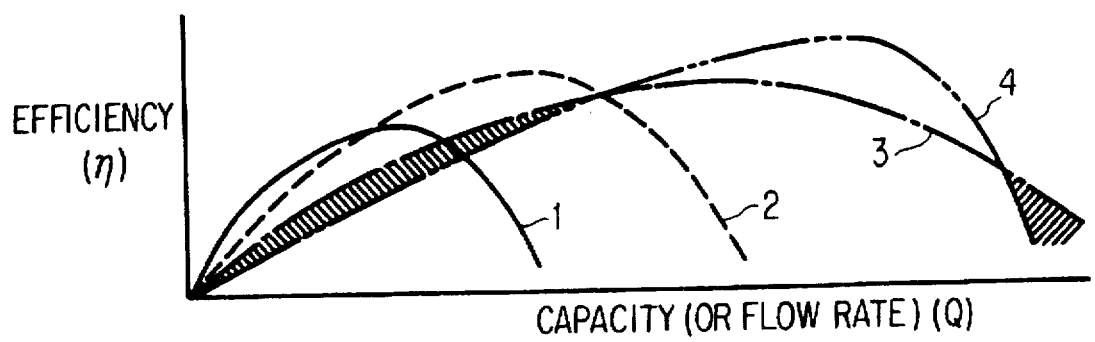
FIG. 15C is a graph showing the relationship between capacity (Q) and efficiency ($\eta$) according to the fifth embodiment of the present invention.

With the above structure, the performance characteristics of the impeller elements A and B are different from each other. FIGS. 15A, 15B and 15C show performance curves of the impeller elements A and B. FIG. 15A shows the relationship between capacity or flow rate (Q) and head (H), FIG. 15B shows the relationship between capacity (Q) and power (P), and FIG. 15C shows the relationship between capacity (Q) and efficiency (η). In FIGS. 15A, 15B and 15C, the impeller element A represents a characteristic curves (2), and the impeller element B represents characteristic curves (1). Therefore, in the double-suction pump comprising the impeller element A and the impeller element B, the capacity or flow rate (Q) and the power (P) are obtained by simply adding the capacity and the power of the impeller element A to the capacity and the power of the impeller element B, respectively, at the same head. Thus, the relationship between the capacity and the power of the double-suction pump is represented by characteristic curves (3) in FIGS. 15A and 15B. The characteristic curves of a conventional double-suction pump are represented by curves (4) in FIGS. 15A, 15B and 15C.

On the other hand, the efficiency (η) of the impeller element B is higher then the efficiency of the impeller element A at small flow rate and high head, and is lower than the efficiency of the impeller element A at large flow rate and low head. Further, the maximum efficiency of the impeller element A is higher than that of the impeller element B. In this case, the efficiency of the double-suction pump comprising the impeller element A and the impeller element B is obtained by weighted mean of efficiencies of the impeller elements A and B. As a result, the efficiency characteristic curve of the double-suction pump has such a tendency that the maximum efficiency is relatively low and the change of efficiency is small over the entire capacity. Therefore, the efficiency characteristic curve represents a gently-sloping tendency.

Further, a thrust applied to the impeller is obtained by subtracting area of the suction port from area of the main plate and then multiplying the resultant value by pressure. In FIG. 14, the thrust $F_A$ acting on the impeller element A and the thrust $F_B$ acting on the impeller element B are expressed by the following formulas.

$$F_A = (\pi/4)\{(D_{2A}^2 - D_{1A}^2)\} \times P$$

$$F_b = (\pi/4)\{(D_{2A}^2 - D_{1B}^2)\} \times P$$

Since the relationship between the diameter $D_{1A}$ of the suction port and the diameter $D_{1B}$ of the suction port is expressed as $D_{1A} > D_{1B}$, the thrust acting on the entire impeller is expressed by the following formula.

$$\text{The total thrust} = F_B - F_A = (\pi/4)\{(D_{1A}^2 - D_{1B}^2)\} \times P$$

Therefore, the thrust acts in one fixed direction. The absolute value of the thrust is not so large because the thrust is generated by the diameter difference of suction ports of the impeller elements A and B. Accordingly, the thrust bearing does not need a large load capacity.

Figure 14:
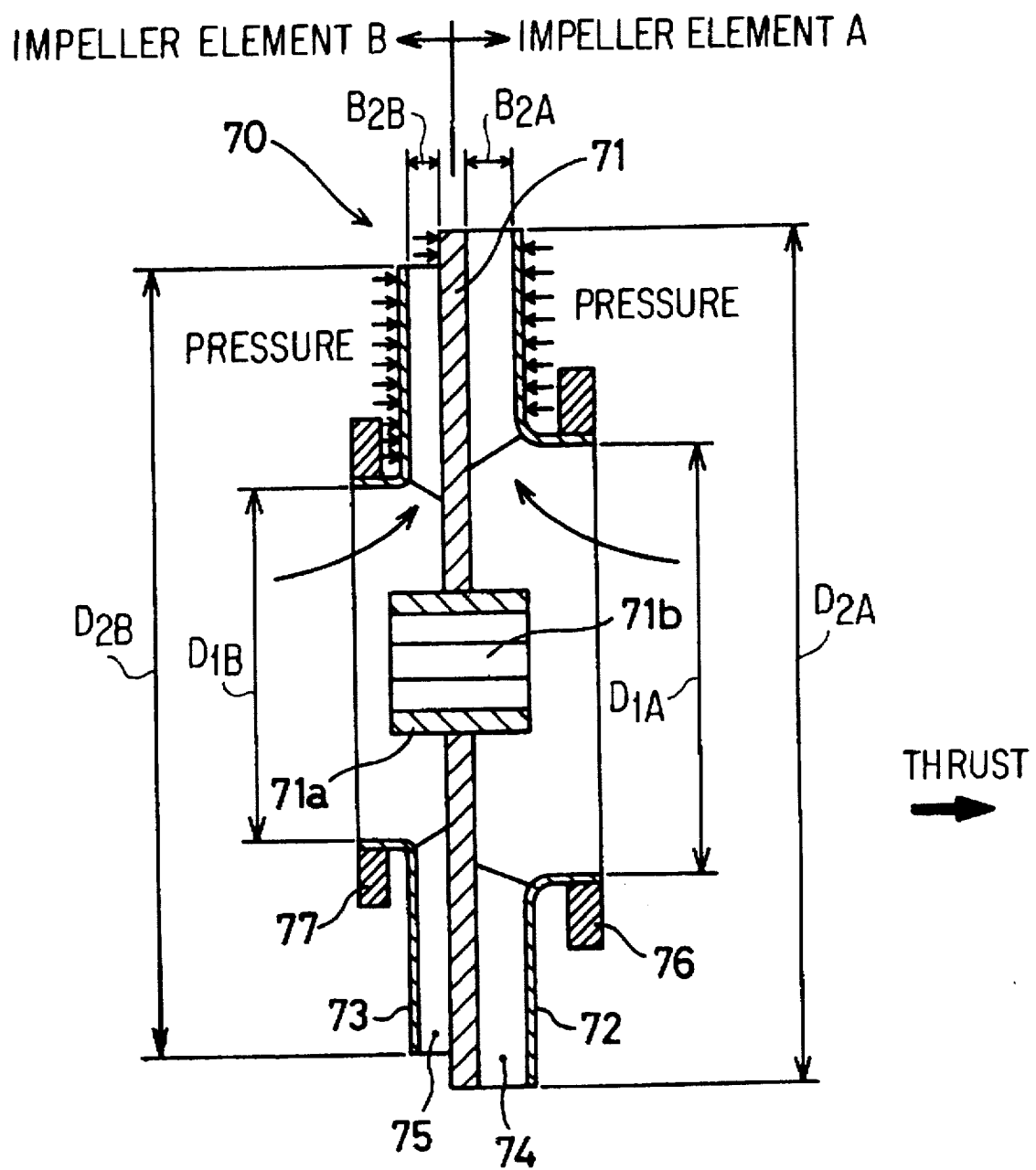
FIG. 14 is a cross-sectional view of a double-suction impeller according to the fifth embodiment of the present invention.

In the embodiment of FIG. 14, the two impeller elements A and B have various different factors including $D_{2A}$, $D_{2B}$; $D_{1A}$, $D_{1B}$; $B_{2A}$, $B_{2B}$ from each other, but do not need to make all factors different from each other. As a simple method, improvement of efficiency characteristic curve is obtainable only by $D_{2A} = D_{2B}$, $D_{1A} > D_{1B}$ and $B_{2A} > B_{2B}$ as shown in FIG. 16.

Figure 17A:
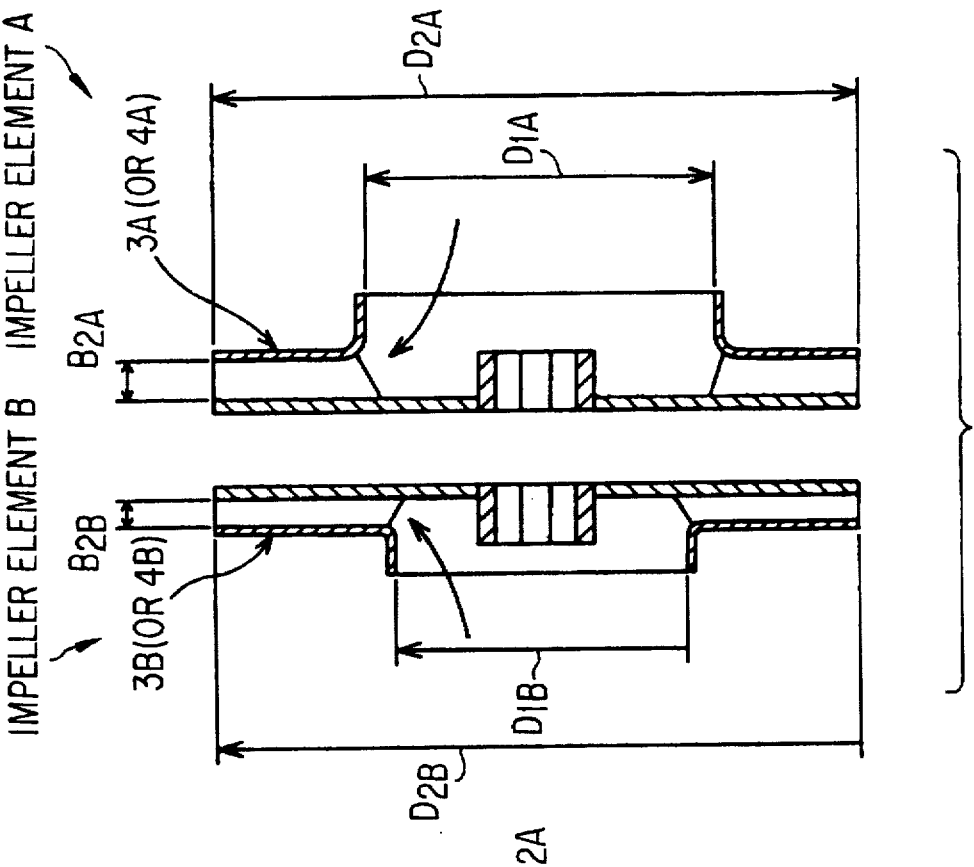
FIG. 17A is a cross-sectional view of single-suction impellers in FIG. 1.
Figure 17B:
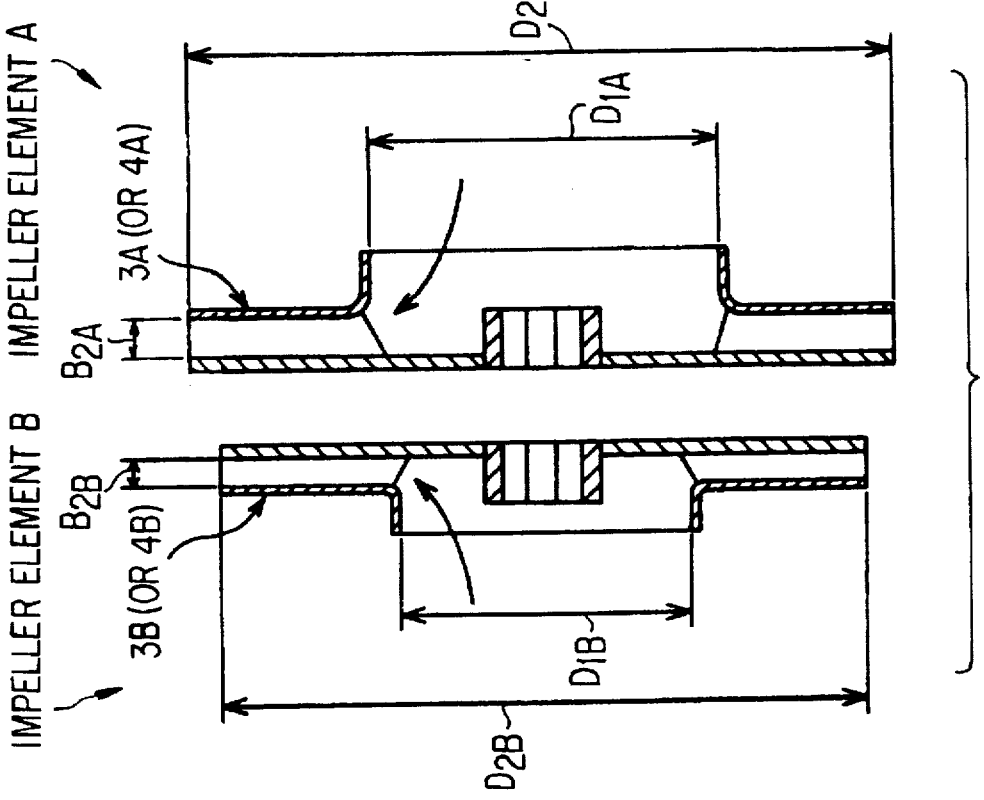
FIG. 17B is a cross-sectional view of single-suction impellers in FIG. 1.
Figure 18:
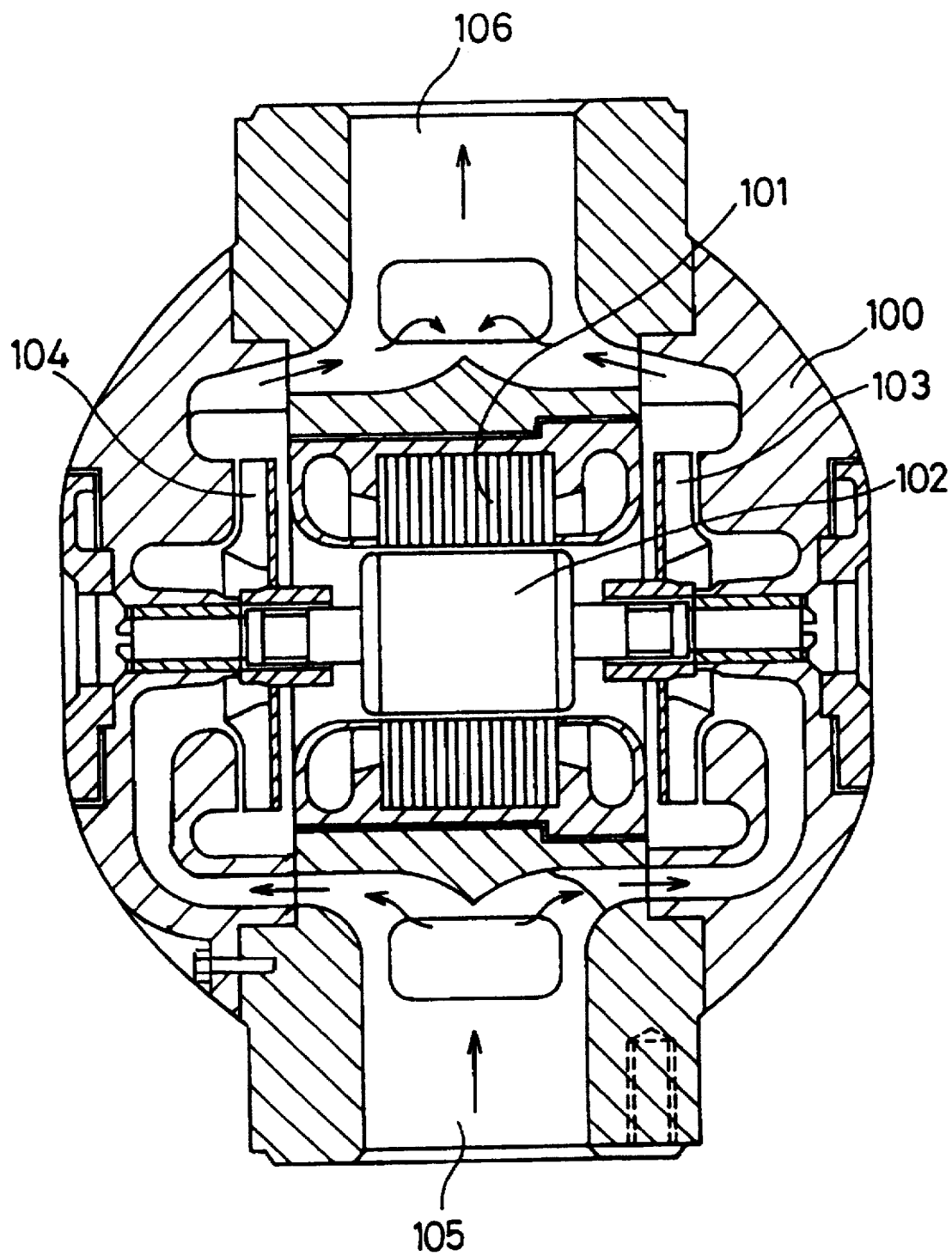
FIG. 18 is a longitudinal cross-sectional view of a conventional pump.

Next, an example in which two impeller elements are separated into two single-suction impellers and a double-suction pump is constructed using a set of two single-suction impellers will be described below with referenced FIGS. 17A and 17B. FIGS. 17A and 17B shows impellers which are incorporated in the full-circumferential flow double-suction pump in FIG. 1. Single-suction impellers 3A and 3B constitute a set of two impeller elements, and single-suction impellers 4A and 4B constitute a set of two impeller elements. The impellers 3A and 4A have the same capacity-head (Q-H) characteristics with each other, the impellers 3B and 4B have the same capacity-head (Q-H) characteristics with each other, and the impellers 3A and 4A have a different capacity-head (Q-H) characteristics from the impellers 3B and 4B. In an example in FIG. 17A, the impeller 3A (or 4A) has the same factors as the impeller element A in FIG. 14, and the impeller 3B (or 4B) has the same factors as the impeller element B in FIG. 14. In an example in FIG. 17B, the impeller 3A (or 4A) has the same factors as the impeller element A in FIG. 16, and the impeller 3B (or 4B) has the same factors as the impeller element B in FIG. 16. That is, in examples in FIGS. 17A and 17B, the two impeller elements A and B of FIGS. 14 and 16 correspond to the single-suction impellers 3A and 3B; 4A and 4B, respectively, and the two-stage double-suction pump is constructed using two sets of single-stage double-suction impellers 3A and 3B; 4A and 4B.

According to the embodiment of FIGS. 17A and 17B, the characteristic curves shown in FIGS. 15A, 15B and 15C are obtainable by preparing two kinds of single-suction impellers which have different capacity-head characteristics from each other. As a result, the embodiment of FIGS. 17A and 17B has the same result as the embodiment of FIGS. 14 and 16. In this case, existing single-suction impellers can be used, therefore, a multi-stage double-suction pump can be easily manufactured.

According to the embodiments in FIGS. 13 through 17, two impeller elements having different capacity-head characteristics from each other are provided in a parallel arrangement, and one of the impeller elements has a flow rate range of a relatively large flow rate and the other of the impeller elements has a flow rate range of a relatively small flow rate. Therefore, the double-suction pump has a gently-sloping efficiency characteristic curve. Even if an operating point of the pump is changed, efficiency is not so changed and can be maintained at a certain level.

Further, according to the embodiments in FIGS. 13 through 17, since the thrust acts in one fixed direction, the thrust bearings can be designed so as to receive the thrust from one fixed direction. Further, vibration of the shaft can be prevented, resulting in solving the problem of noise.

Although certain preferred embodiments of the present invention has been shown and described in detail, it should be understood that various changes and modifications may be made therein without departing from the scope of appended claims.

What is claimed is:

1. A full-circumferential flow double-suction pump comprising:

a motor having a stator, a rotor mounted on a shaft and disposed in said stator for rotation relative to said stator and an outer frame casing enclosing said stator;

an outer cylinder disposed around said outer frame casing with an annular space defined therebetween, said outer cylinder having a discharge port defined therein in communication with said annular space;

a pair of pump assemblies mounted on respective opposite ends of said shaft for pumping a fluid into said annular space;

a pair of cylindrical cup-shaped pump casings connected to respective opposite ends of said outer cylinder for housing respective pump assemblies, said cylindrical cup-shaped pump casings having respective suction nozzles;

a header pipe for connecting said suction nozzles to each other and having a suction port defined therein for introducing a fluid therethrough and through said suction nozzles into said pump assemblies; and a partition wall disposed in said cylindrical cup-shaped pump casing and dividing the interior space of said cylindrical pump casing into a suction pressure side communicating with said suction nozzle and a discharge pressure side communicating with said annular space.

2. A full-circumferential flow double-suction pump according to claim 1, further comprising an inner casing disposed in said partition wall in covering relation to the impeller of each of the pump assemblies.

3. A full-circumferential flow double-suction pump according to claim 2, further comprising a resilient seal member interposed between said partition wall and said inner casing.

4. A full-circumferential flow double-suction pump according to claim 1, wherein said outer cylinder has a pair of flanges on respective open ends thereof, said cylindrical cup-shaped pump casing has a flange on an open end thereof, and adjacent flanges of said outer cylinder and said cylindrical cup-shaped pump casing are clamped by loose flanges.

* * * * *